United States Patent [19]

Mirza et al.

[11] 4,225,415
[45] Sep. 30, 1980

[54] RECOVERING HYDROCARBONS FROM HYDROCARBON-CONTAINING VAPORS

[75] Inventors: Zia I. Mirza, La Verne; Everett W. Knell, Los Alamitos; Bruce L. Winter, Danville, all of Calif.

[73] Assignee: Occidental Petroleum Corporation, Los Angeles, Calif.

[21] Appl. No.: 65,736

[22] Filed: Aug. 10, 1979

Related U.S. Application Data

[63] Continuation of Ser. No. 926,281, Jul. 20, 1978, abandoned, which is a continuation-in-part of Ser. No. 700,010, Jun. 25, 1976, abandoned.

[51] Int. Cl.$^3$ .................. C10G 1/00; C10G 5/06; B01D 5/00
[52] U.S. Cl. .................. 208/8 R; 208/340; 208/341; 55/48; 55/84; 55/89
[58] Field of Search .................. 208/8 LE, 340, 341, 208/8 R; 55/48, 84, 89

[56] References Cited

U.S. PATENT DOCUMENTS

| 1,954,352 | 4/1934 | Dornbrook et al. | 202/108 |
|---|---|---|---|
| 2,721,888 | 10/1955 | Harris | 55/89 |
| 2,723,951 | 11/1955 | Minet | 201/28 |
| 2,817,411 | 2/1957 | Coberly | 55/89 |
| 2,827,125 | 3/1958 | Hall et al. | 55/89 |
| 2,982,701 | 5/1961 | Scott, Jr. | 208/11 R |
| 3,655,518 | 4/1972 | Schnolfeld et al. | 201/12 |
| 3,839,186 | 10/1974 | Beyer | 208/8 |
| 3,997,423 | 12/1976 | Greene | 208/8 |

Primary Examiner—Delbert E. Gantz
Assistant Examiner—William G. Wright
Attorney, Agent, or Firm—Christie, Parker & Hale

[57] ABSTRACT

Values are recovered from a hydrocarbon-containing vapor by contacting the vapor with quench liquid consisting essentially of hydrocarbons to form a condensate and a vapor residue, the condensate and quench fluid forming a combined liquid stream. The combined liquid stream is mixed with a viscosity-lowering liquid to form a mixed liquid having a viscosity lower than the viscosity of the combined liquid stream to permit easy handling of the combined liquid stream. The quench liquid is a cooled portion of the mixed liquid. Viscosity-lowering liquid is separated from a portion of the mixed liquid and cycled to form additional mixed liquid.

84 Claims, 14 Drawing Figures

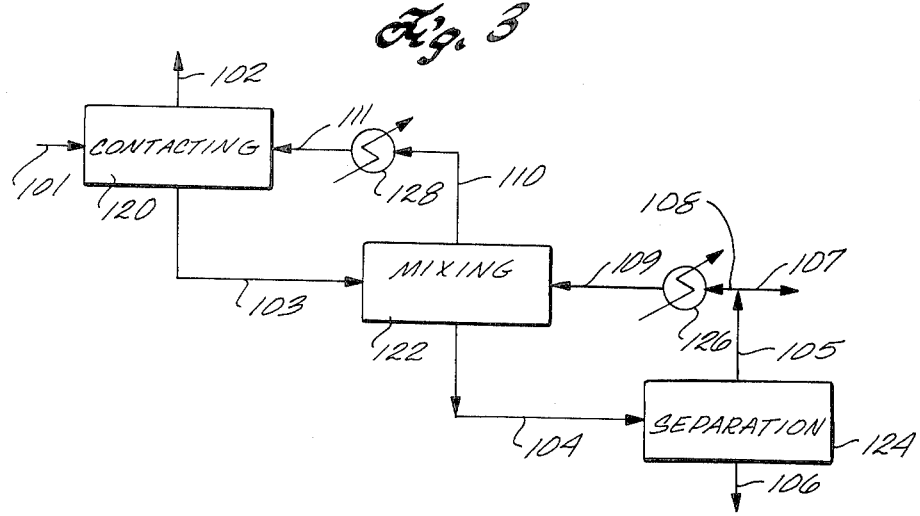
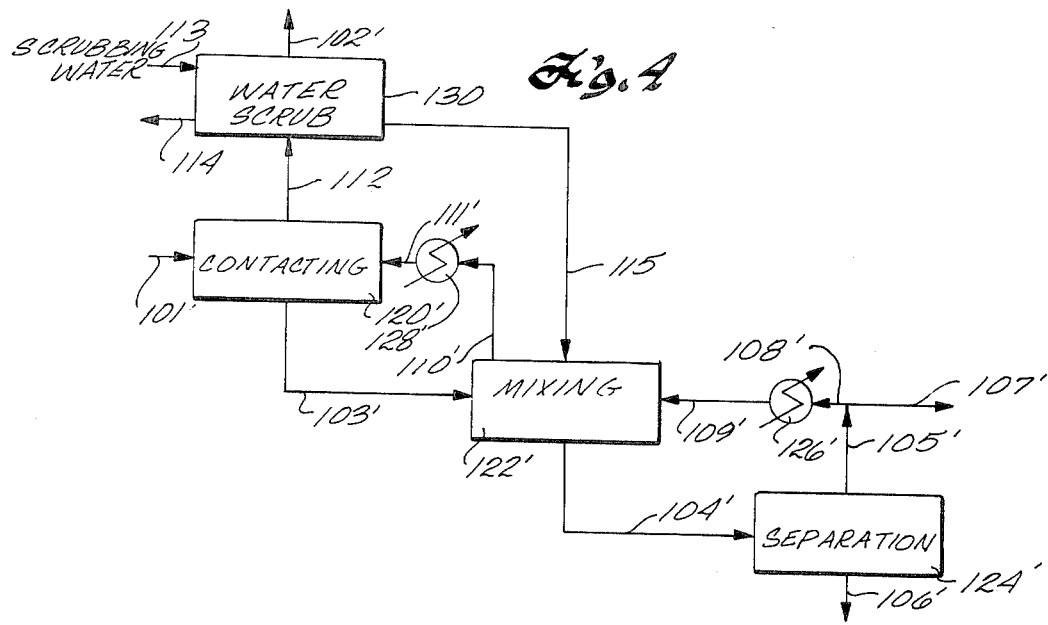

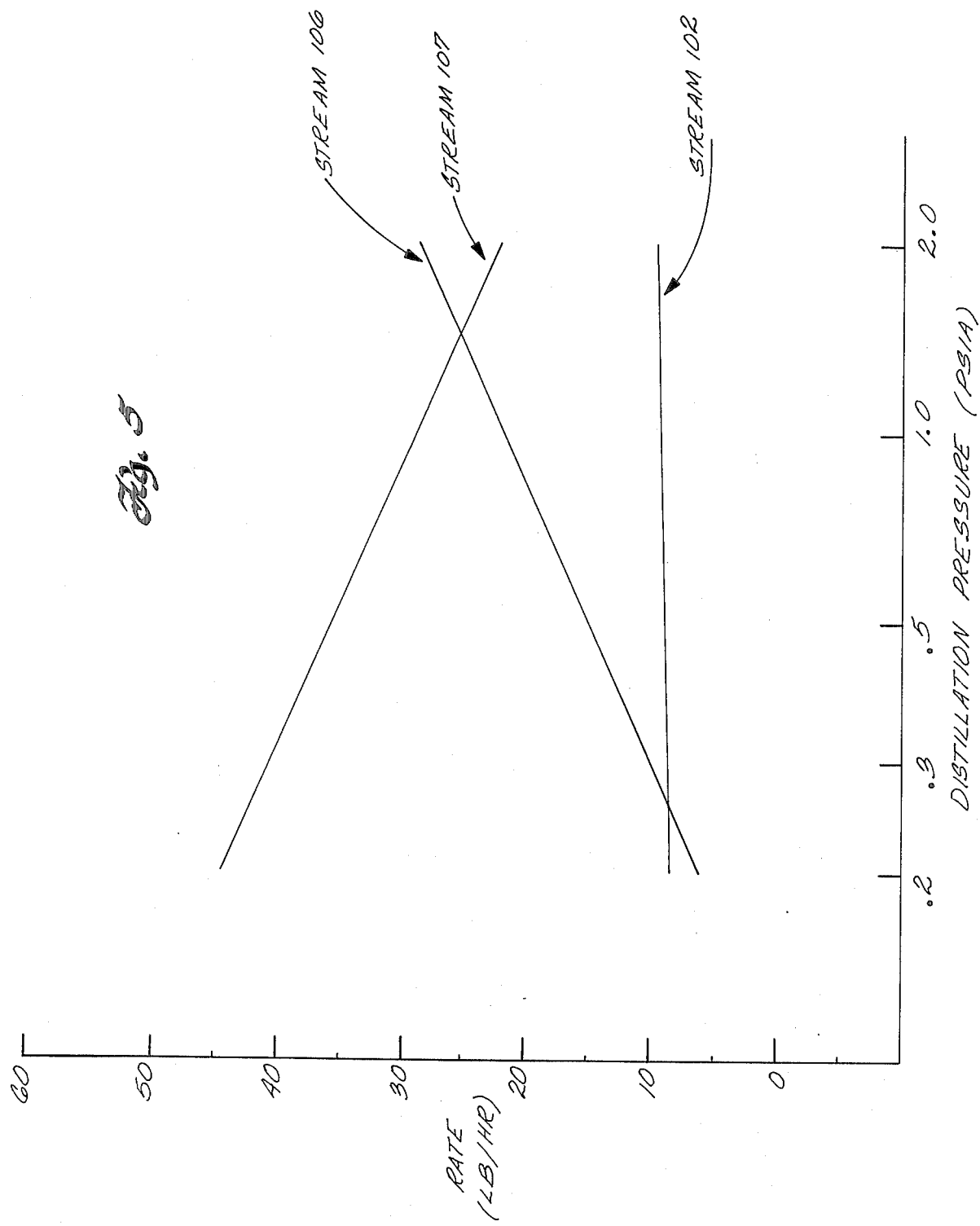

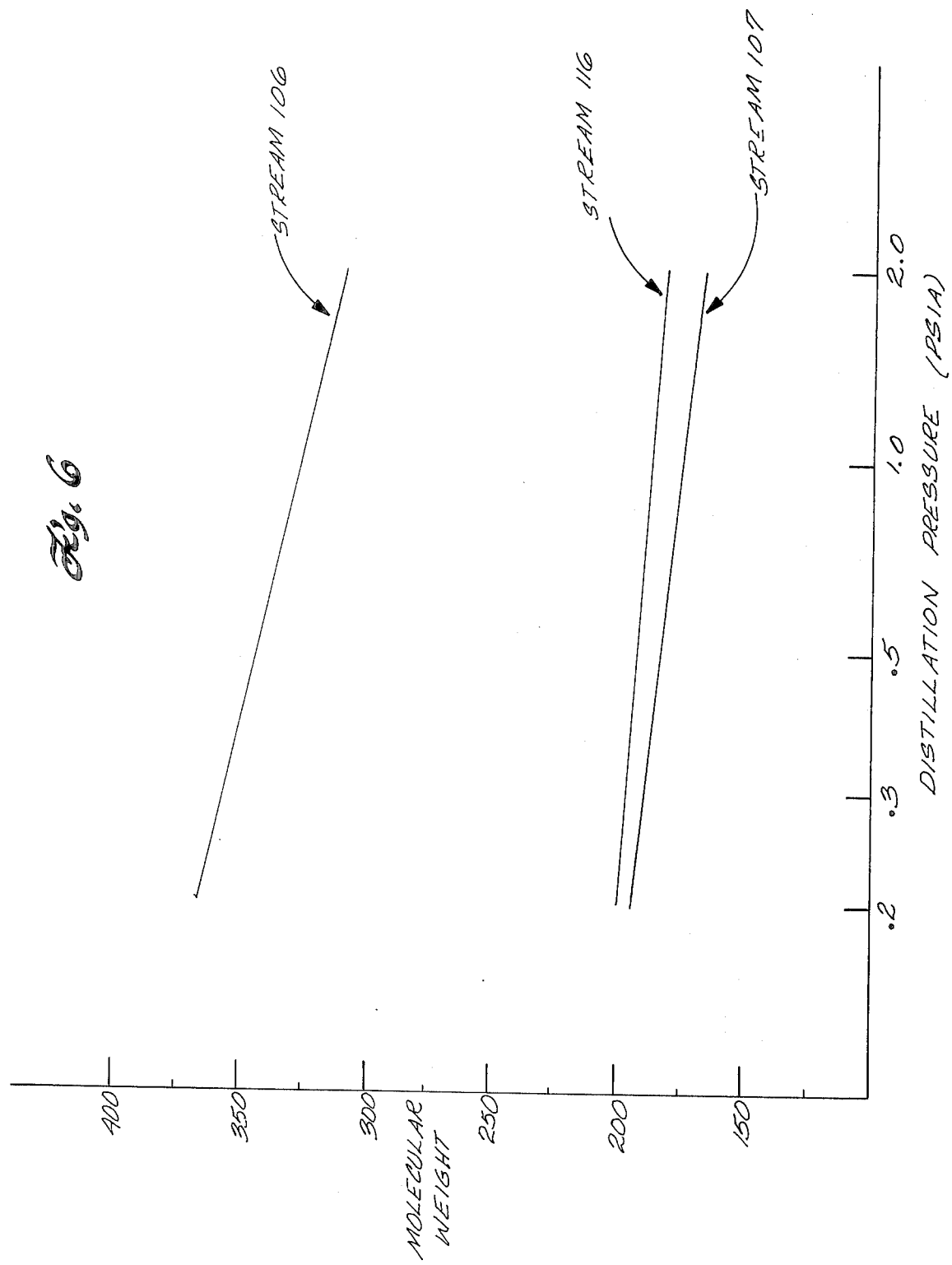

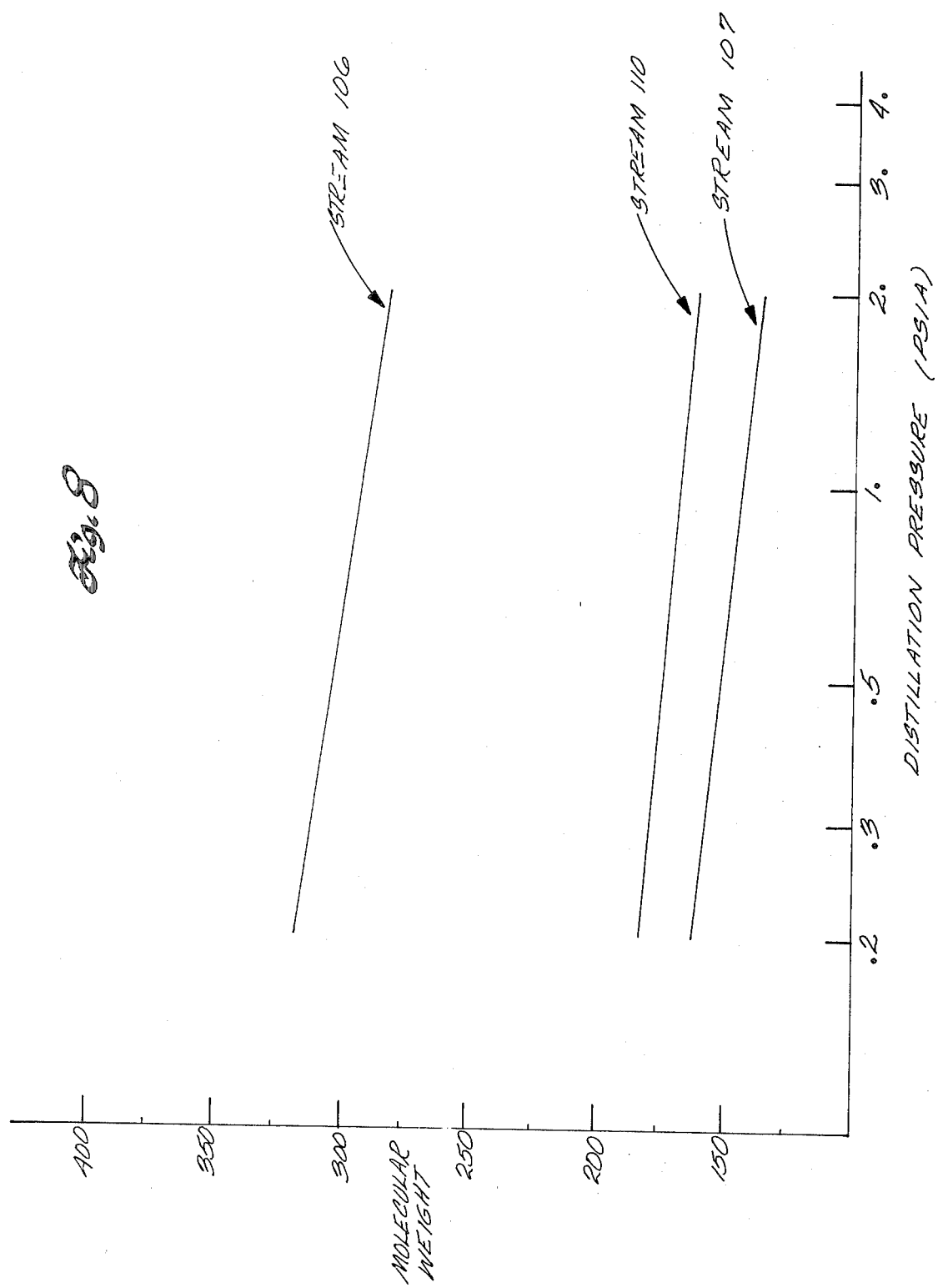

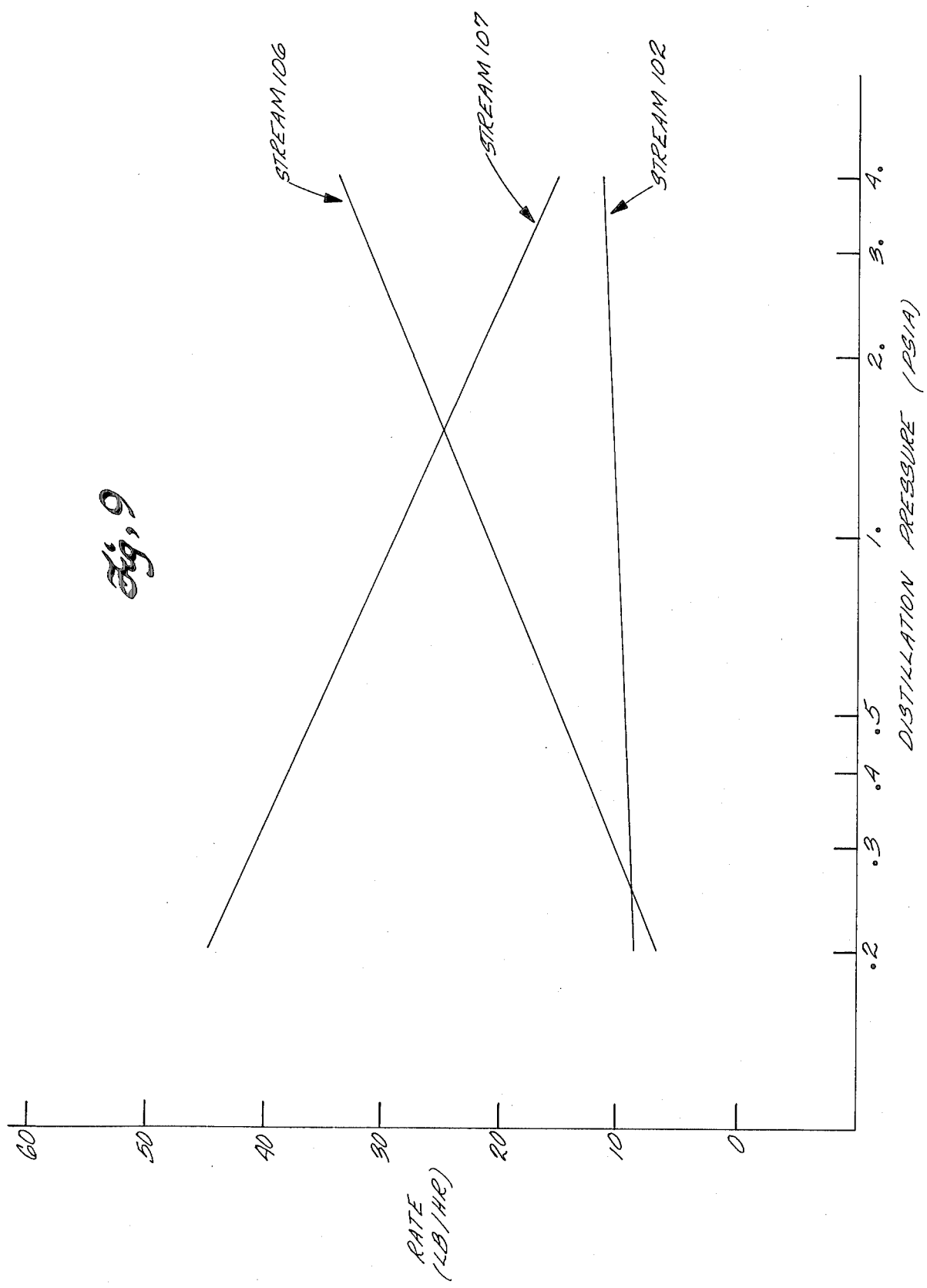

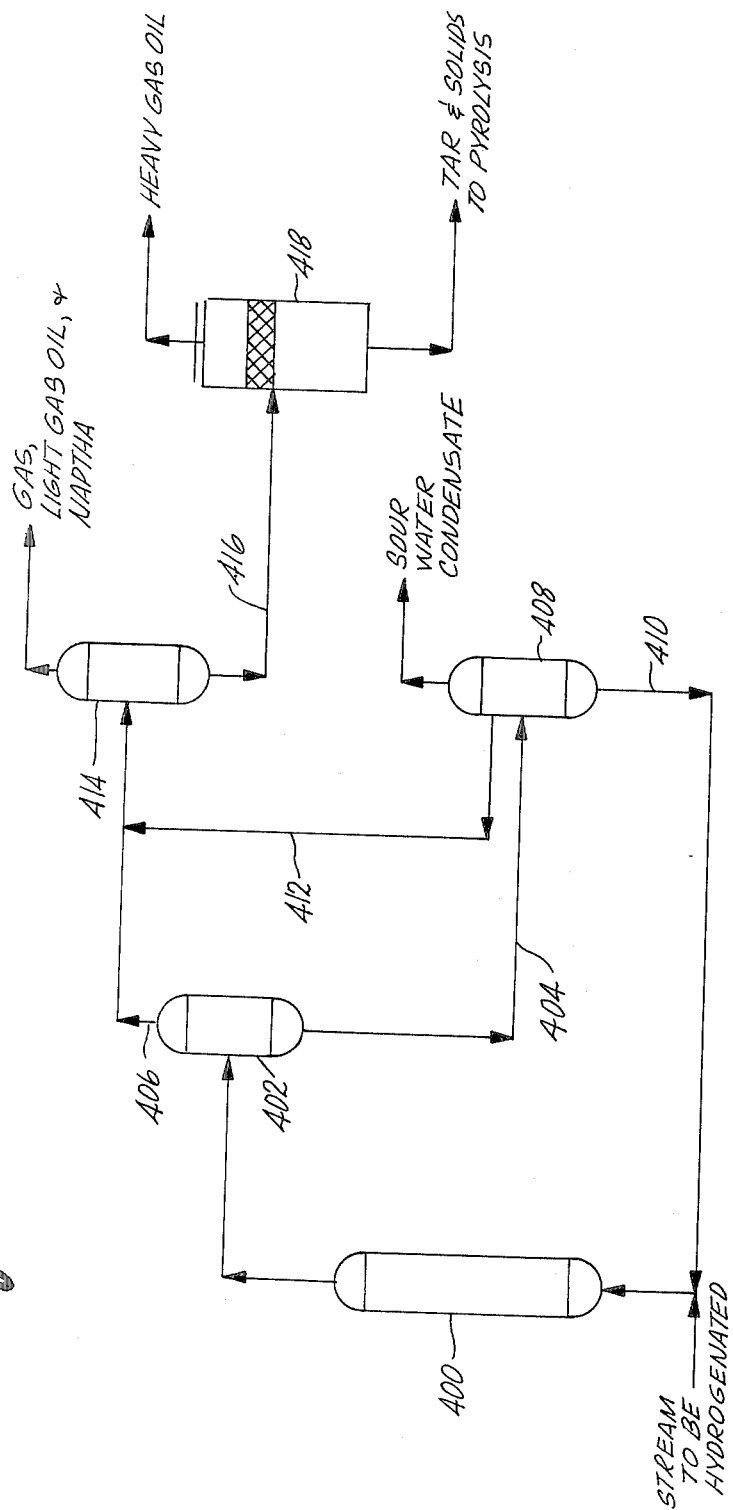

RECOVERING HYDROCARBONS FROM HYDROCARBON-CONTAINING VAPORS

The government has rights in or in respect of this invention pursuant to Contract No. E(49-18)-2244 awarded by the U.S. Energy Research and Development Administration. CROSS-REFERENCES This application is a Continuation of U.S. Application Ser. No. 926,281, filed July 20, 1978, now abandoned, which is a Continuation-in-Part application of copending U.S. application Ser. No. 700,010, filed June 25, 1976, now abandoned and which is incorporated herein by this reference.

BACKGROUND OF THE INVENTION

Fluid fossil fuels, such as oil and natural gas, are becoming scarce as these fuels are consumed by a world whose population is continually growing. Also, the supply of oil to industrialized countries has been and could be again interrupted for political reasons. For these reasons, much attention is being directed towards pyrolyzing carbonaceous material to liquid and gaseous hydrocarbons.

A problem encountered in the pyrolysis of many carbonaceous materials, such as coal, is recovery of hydrocarbons from the pyrolytic vapors. These pyrolytic vapors typically contain entrained finely divided solids and hydrocarbons having a wide boiling range from components as light as methane up to heavy viscous fractions which are commonly known as "tars." In slow pyrolysis such as experienced with coke ovens, primary tar fragments produced recombine to form coke and crack to form gas, coke, and a lower yield of secondary tar. By contrast, when coal is heated to its final temperature rapidly and the vapors are immediately condensed, a higher yield of complex primary tar results. Whereas this technique offers significant advantage in ultimate yield, the condensation and recovery of the primary tar is more difficult.

The tar produced by pyrolysis of coal is a complex mixture of compounds with a wide range of molecular weight. The recovery, purification, and subsequent processing of this material to fuel oil or synthetic crude oil is difficult because of its unfavorable physical and chemical properties. These include high viscosity, surface tension, low hydrogen to carbon ratio, and polymerization and cracking tendencies. In processes which give a high yield of liquids such as rapid pyrolysis, these factors are pronounced. For example, when pyrolyzing bituminous coal, the tar in the pyrolytic vapor is so viscous it cannot be poured at room temperature.

Attempts to lower the viscosity of the tar by operating a recovery process at higher temperatures results in degradation of the tar. Also, the tar contains the particulate matter entrained by the pyrolytic vapors. These solid particles are difficult to remove from the tars because of the high viscosity of the tar, and the small particle size, often less than 10 microns, of the entrained solids.

The presence of appreciable quantities of entrained solids in the tar derived from solid carbonaceous materials is highly undesirable. Equipment employed in the handling and subsequent treatment of the tar may become fouled due to the presence of the fine solid materials with impractical maintenance and replacement costs thereby resulting. In addition, at temperatures characteristic of pyrolysis treatments of solid carbonaceous materials, it is possible that fine spent material, when present in relatively large proportions, may act as a catalyst and effect polymerization of the tar.

Moreover, liquid hydrocarbons derived from carbonaceous solids containing significant quantities of solid materials in finely divided form usually are unsatisfactory for commercial utilization. The presence of suspended solids gives rise to fouling of equipment employed in refining, pumping, storing and like handling operations with resultant increase in the overall maintenance and replacement costs of such items.

Solid carbonaceous pyrolysis residue in the tar is characterized by having sensible heat value and, since it also contains fixed carbon, combustion heat value. In some cases the amount of fines materials entrained in the tar may attain a value as high as above 10 percent of the total carbonaceous solids charged to the pyrolysis zone. In order to maintain the efficiency and economy of such methods utilized to recover the desired hydrocarbon values from the solid carbonaceous material at practical levels, it generally is imperative that the heat value of the entrained residue be recovered.

Attempts to recover primary tar produced by rapid heating such as in fluidized or entrained beds by contacting pyrolytic vapors with water to condense, coalesce, and scrub hydrocarbons from the vapor have been ineffective. This is because a portion of the high molecular weight liquid droplets do not readily coalesce but instead remain entrained as fine droplets in the presence of noncondensible gases present in pyrolysis processes, and particularly in rapid pyrolysis processes which employ recycled gas in addition to the gaseous products. In addition, the liquid product collected is not fluid at temperatures practical for a water scrub system.

To overcome these problems, some processes have employed absorbers, with recycling of product tar to directly cool, condense, and scrub tar from pyrolytic vapor, such as the COED process as reported to the Office of Coal research in R & D Report #56 and Interim Report #1. Typically, this type of operation is performed stagewise, where the highest boiling fraction and char fines are collected in the first stage. The stream from the first stage is then recycled to the pyrolysis reactor because of its high solids content and because complete separation of solids from this stream is uneconomical. In the pyrolysis reactor, the heavy liquid polyaromatic hydrocarbons in this stream yield mostly char and gas, which are generally less valuable than liquid hydrocarbons. Thus the COED recovery method results in lowering the liquid yield of the pyrolysis process.

In addition, to minimize the amounts of liquids lost due to recycle to the pyrolysis reactor, the first stage of the COED process is operated at high temperature. This results in condensation of a very viscous tar fraction which, during process upsets resulting in loss of temperature control in the first stage and during shutdown, can solidify and plug the processing equipment. Also, solids can escape the first stage and contaminate the product oil. Thus separation of solids from the product tar is still necessary especially when fixed bed hydrotreatment is used because such char can plug the bed. This solids separation step is difficult because of the high viscosity of the full range tar and small density difference between the tar and suspended solids and the small particle size of the solids.

Thus, there is a need for a process for recovery of hydrocarbons from pyrolytic vapors which permits separation of hydrocarbon fractions covering a wide range of boiling points, easy handling of the tars recovered, removal of entrained solids from the hydrocarbon fractions, and easy hydrogenation of the tar to upgrade the value of the tar and to prevent its self-polymerization.

SUMMARY OF THE INVENTION

This invention is for a process having the above features. In this process hydrocarbon-containing vapors at a temperature of at least 700° F. are contacted with a quench liquid. The quench liquid consists essentially of hydrocarbons and has a temperature sufficiently low to form a condensate from the hydrocarbon-containing vapors, thereby leaving a vapor residue. The condensate and quench liquid form a combined liquid stream. A viscosity-lowering liquid is mixed with the combined liquid stream to form a mixed liquid which has a viscosity lower than the viscosity of the combined liquid stream.

A first portion of the mixed liquid is cooled to form the quench liquid for contacting the hydrocarbon-containing vapors. A second portion of the mixed liquid is separated into at least a viscosity-lowering liquid fraction for mixing with the combined liquid stream and a high boiling hydrocarbon fraction which has a higher volume average boiling point than the volume average boiling point of the viscosity-lowering liquid. The high boiling hydrocarbon fraction is recovered as tar product.

Preferably the temperature of the mixed liquid is below 700° F. and more preferably below 500° F. to prevent degradation of the hydrocarbon product due to self-polymerization. To maintain economic recovery of high temperature sensible heat, the mixed liquid is maintained at a temperature greater than about 100° F. and more preferably greater than 200° F.

The weight ratio of the viscosity-lowering liquid to the condensate in the combined liquid preferably is at least about 0.01 and more preferably greater than about 0.1, to obtain the benefits of reducing the viscosity of the combined liquid stream. Because of the costs associated with pumping the viscosity-lowering liquid and separating the viscosity-lowering liquid from the mixed liquid, preferably the weight ratio of the viscosity-lowering liquid mixed with the combined liquid stream to the condensate is less than about 500, and more preferably less than about 100.

Preferably the second portion of the mixed liquid is separated into a viscosity-lowering liquid and a higher boiling hydrocarbon fraction by distillation, and more preferably by flash vaporization at less than atmospheric pressure at low temperatures to prevent degradation of the high boiling hydrocarbon fraction.

When the hydrocarbon-containing vapors contain entrained solids, the solids are found in the combined liquid stream and end up in the mixed liquid. Solids are more easily separated from the mixed liquid, such as by filtration, when the mixed liquid has a low viscosity compared to the viscosity of the condensate.

The separation of the solids from the mixed liquid can be performed in combination with the upgrading of the mixed liquid through hydrogenation. When such upgrading by hydrogenation is desired, the removal of solids can be before or after the hydrogenation process. For example, if a fixed bed hydrogenation is conducted, the solids can be removed prior to the hydrogenation in order to prevent plugging of the bed. If a fluidized bed for hydrogenation is utilized, the solids removal step can be conducted following hydrogenation. For example, when a fluidized bed is used, the mixed liquid stream can be hydrogenated then fractionated into a light fraction substantially solids free and a heavier fraction containing substantially all of the solids. Such a heavy fraction can be recycled to the pyrolysis reactor for pyrolysis of the tars and the solids can be used as a heat carrier for the pyrolysis or can be combusted or partially combusted under combustion condition to supply the necessary heat for pyrolysis.

In order to upgrade the value of the hydrocarbons condensed from the vapors and prevent self-polymerization, the mixed liquid, the high boiling hydrocarbon fraction, and/or the viscosity-lowering liquid can be hydrogenated. The hydrogenation can be conducted in either fixed or fluidized beds using hydrogenation catalysts.

This process overcomes problems encountered in recovering hydrocarbons from hydrocarbon-containing vapors described above. Because the viscous tars are dissolved in a viscosity-lowering liquid, easy handling of the tars is possible without operating the process at high temperatures. This means that the recovery process can be operated at comparatively low temperatures to prevent degradation of the tar. In addition, it is easier to remove entrained solids from the low viscosity mixed liquid than it is from undissolved tars. Hydrogenation of the tars is also facilitated because of the low viscosity of the condensate solution. Hydrogenation of tars in the mixed liquid is particularly facilitated when done in combination with solids separation whether preceding or following such solids separation.

These and other features, aspects and advantages of this invention will become apparent with respect to the accompanying drawings, following description of the invention and appended claims.

DRAWINGS

Figure 13:
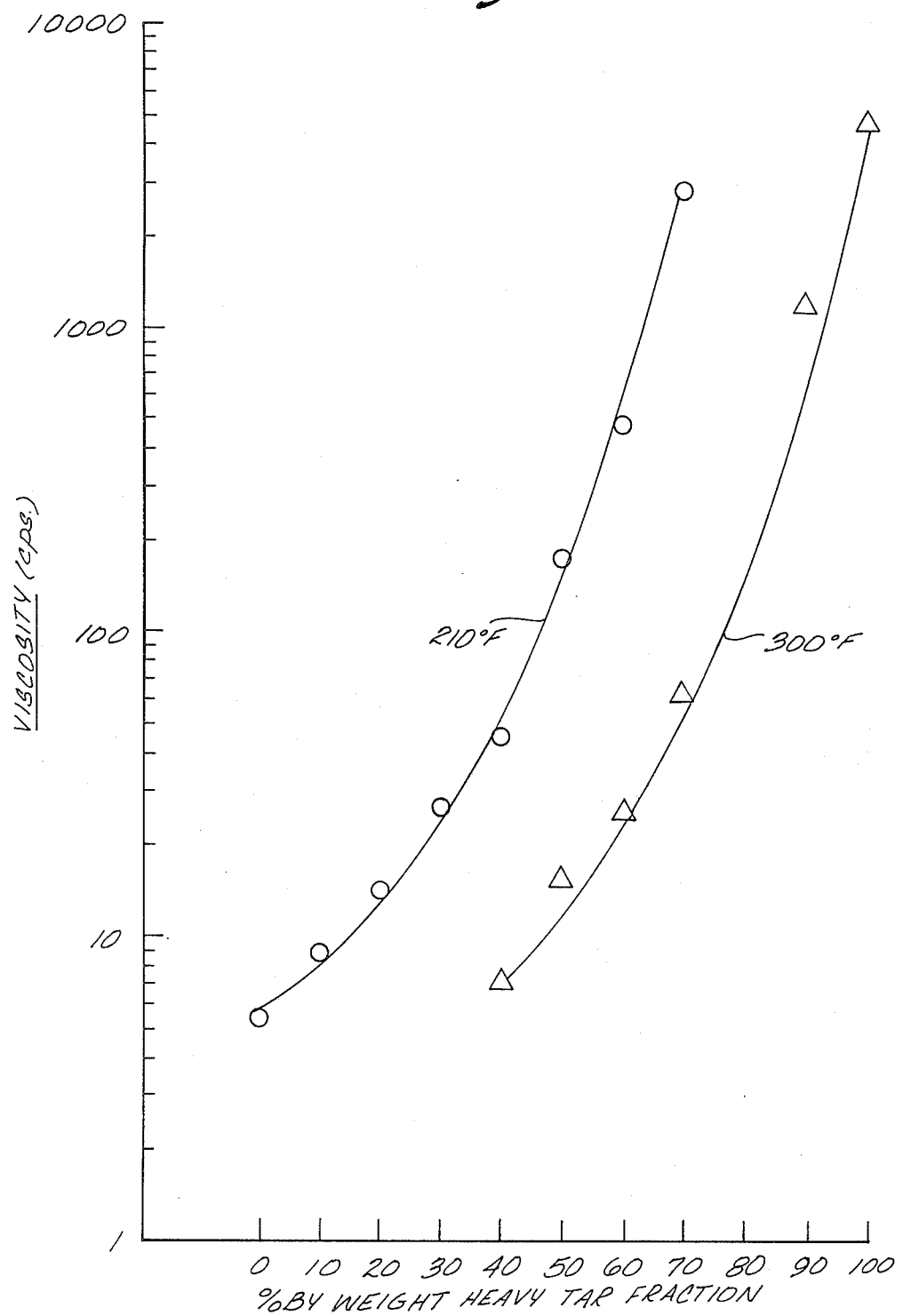

FIG. 3 schematically presents a process embodying features of this invention;

FIG. 4 schematically shows another process embodying features of this invention;

FIGS. 5–12 show the effect of process variables on flow rates and the molecular weight of streams of the process shown in FIG. 3;

FIG. 13 shows the effect of diluting tars with a viscosity-lowering liquid on the viscosity of the tars; and FIG. 14 schematically shows the fluidized bed hydrogenation process with subsequent product production, solids removal and recycle which is a feature of this invention

DETAILED DESCRIPTION OF THE INVENTION

The invention will first be described in general terms with reference to FIG. 3 and then in terms of specific working examples shown in FIGS. 1 and 2.

With reference to FIG. 3, hydrocarbon-containing vapors 101 which are at a temperature of at least 700° F. are contacted in a contacting zone 120 with a quench liquid 111 consisting essentially of hydrocarbons condensed from the hydrocarbon-containing vapor. The quench liquid has a sufficiently low temperature to form a condensate and a vapor residue 102 from the hydrocarbon-containing vapors. The vapor residue contains the lower boiling hydrocarbons present in the hydrocarbon-containing vapors 101 and lower boiling hydrocarbons present in the quench liquid. A combined liquid stream 103 contains the condensate formed from the hydrocarbon-containing vapors as well as the bulk of the quench liquid.

The combined liquid stream 103 is mixed with a viscosity-lowering liquid 109 in a mixing zone 122, thereby forming a mixed liquid. The viscosity-lowering liquid has a viscosity lower than the viscosity of the mixed liquid, and because of the presence of the viscosity-lowering liquid the mixed liquid has a viscosity lower than the viscosity of the combined liquid stream 103 and more importantly, the viscosity of the condensed liquid.

A first portion of 110 of the mixed liquid is cooled by cooling means 128 to form the quench liquid 111 used for contacting the hydrocarbon-containing vapors. The sensible heat of the hydrocarbon-containing vapors 101 from the pyrolysis temperature to quench temperature is recovered in the cooling zone.

The mixed liquid is maintained at a temperature of less than about 700° F. and preferably less than about 500° F. to prevent self-polymerization of tars in the mixed liquid and to prevent degradation of the hydrocarbons due to high temperatures. The flow rate and temperature of the quench liquid stream 111 are the principal process parameters which are controlled to vary the temperature of the mixed liquid. In addition, the temperature of the viscosity-lowering liquid stream 109 can be varied as a secondary control on the temperature of the mixed liquid.

The mixed liquid is maintained at a low temperature because the lower the temperature of the mixed liquid, the less chance of degradation of the hydrocarbon product. However, as the temperature of the mixed liquid decreases its viscosity increases, thereby offsetting the advantages obtained by mixing the viscosity-lowering liquid with the combined liquid stream. In addition, by maintaining the mixed liquid at higher temperatures, the sensible heat of the mixed liquid can be recovered in a more valuable high temperature form. Therefore, preferably the mixed liquid is maintained at a temperature greater than about 100° F., and more preferably greater than about 200° F.

In summary, preferably the mixed liquid is maintained at a temperature between about 100° F. and 700° F., and more preferably between about 200° F. and about 500° F.

A second portion 104 of the mixed liquid is passed from mixing zone 122 to a separation zone 124 where the second portion is separated as by distillation into a first fraction containing primarily intermediate boiling hydrocarbons which is used for forming the viscosity-lowering liquid, and a second high boiling or tar fraction 106. The second fraction has a higher boiling curve and higher volume average boiling point and a higher average molecular weight than the first fraction.

The first fraction is passed to the mixing zone 122, preferably after cooling by cooling means 126 such as a shell-and-tube heat exchanger. When separation is effected by distillation, the cooling means 126 serves as a condenser to condense intermediate boiling hydrocarbons 105 to form the viscosity-lowering liquid.

If there is more of the first fraction 105 available than is required for forming the viscosity-lowering liquid stream 109, than a portion 107 of the first fraction 105 is withdrawn as intermediate boiling hydrocarbon product. Alternatively, a portion of the mixed liquid stream 104 can be withdrawn as product.

The weight ratio of the viscosity-lowering liquid 109 to the condensate formed in the contacting zone is from about 0.01 to about 500°. At ratios less than 0.01 there is insufficient lowering of the viscosity of the combined liquid stream and at ratios greater than about 500, it becomes prohibitively expensive to circulate the large volumes of viscosity-lowering liquid required due to the costs of pumping and the costs of separating viscosity-lowering liquid from the mixed liquid. A good trade-off between the high costs associated with high levels of viscosity-lowering liquid and inadequate dilution obtained with low levels of viscosity-lowering liquid is when the ratio of the viscosity-lowering liquid to condensate is from about 0.1 to about 100.

Although the weight of the condensate cannot be directly measured because condensate is combined with quench liquid, it can be determined by subtracting the weight of the vapor residue 102 and any solids present in the combined liquid from the weight of the hydrocarbon-containing vapors 101 introduced to the contacting zone 120. This is actually a net condensate rate since a small portion of the quench liquid is vaporized and is present in the vapor residue. Thus more hydrocarbons are condensed from incoming hydrocarbon-containing vapors than are calculated by this method. However, the weight ratios of viscosity-lowering liquid to condensate presented herein are based on this method of calculating condensate rate.

Figure 1:
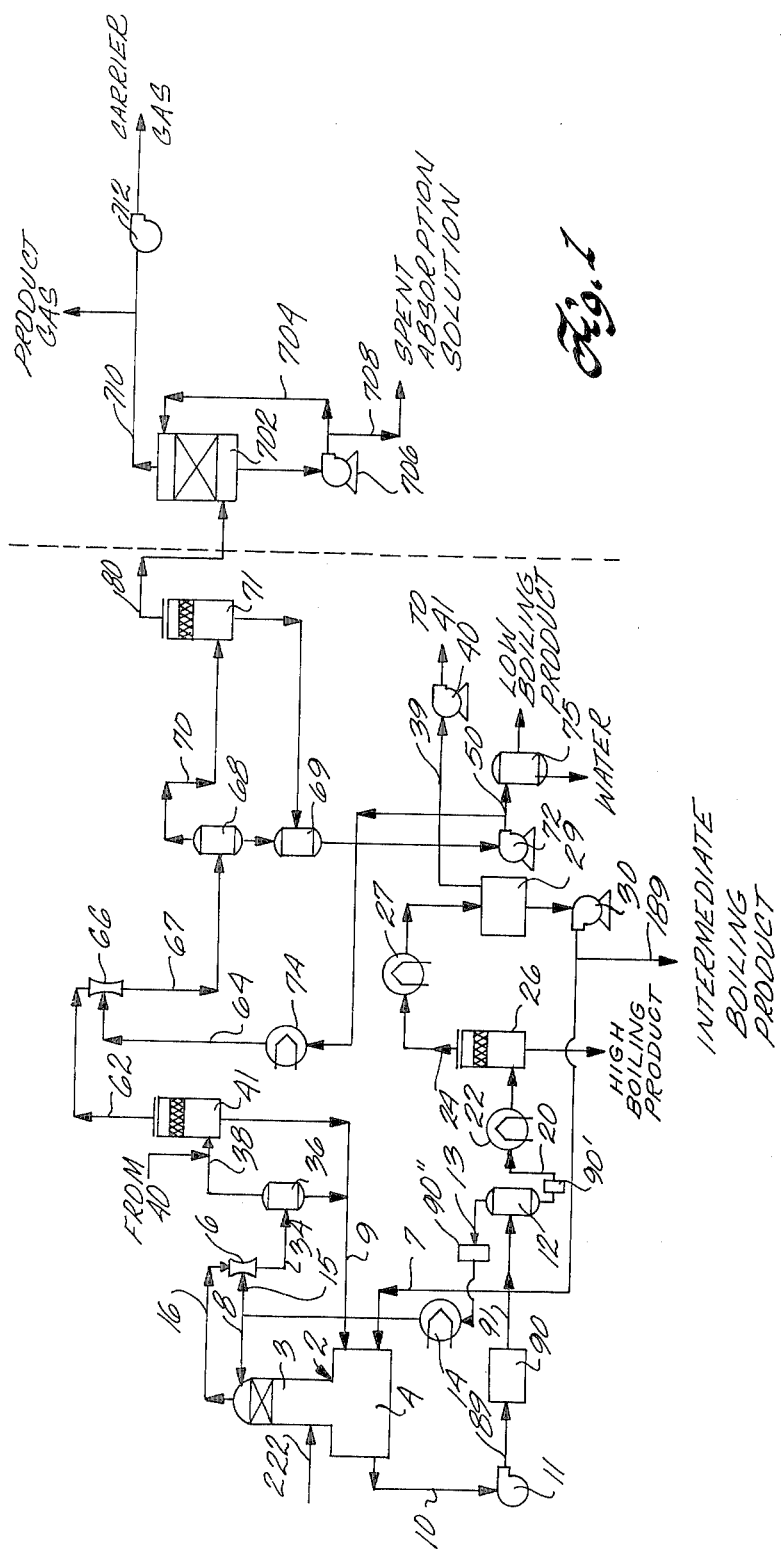
FIG. 1 shows in detail a pyrolytic vapor recovery operation embodying features of this invention.
Figure 2:
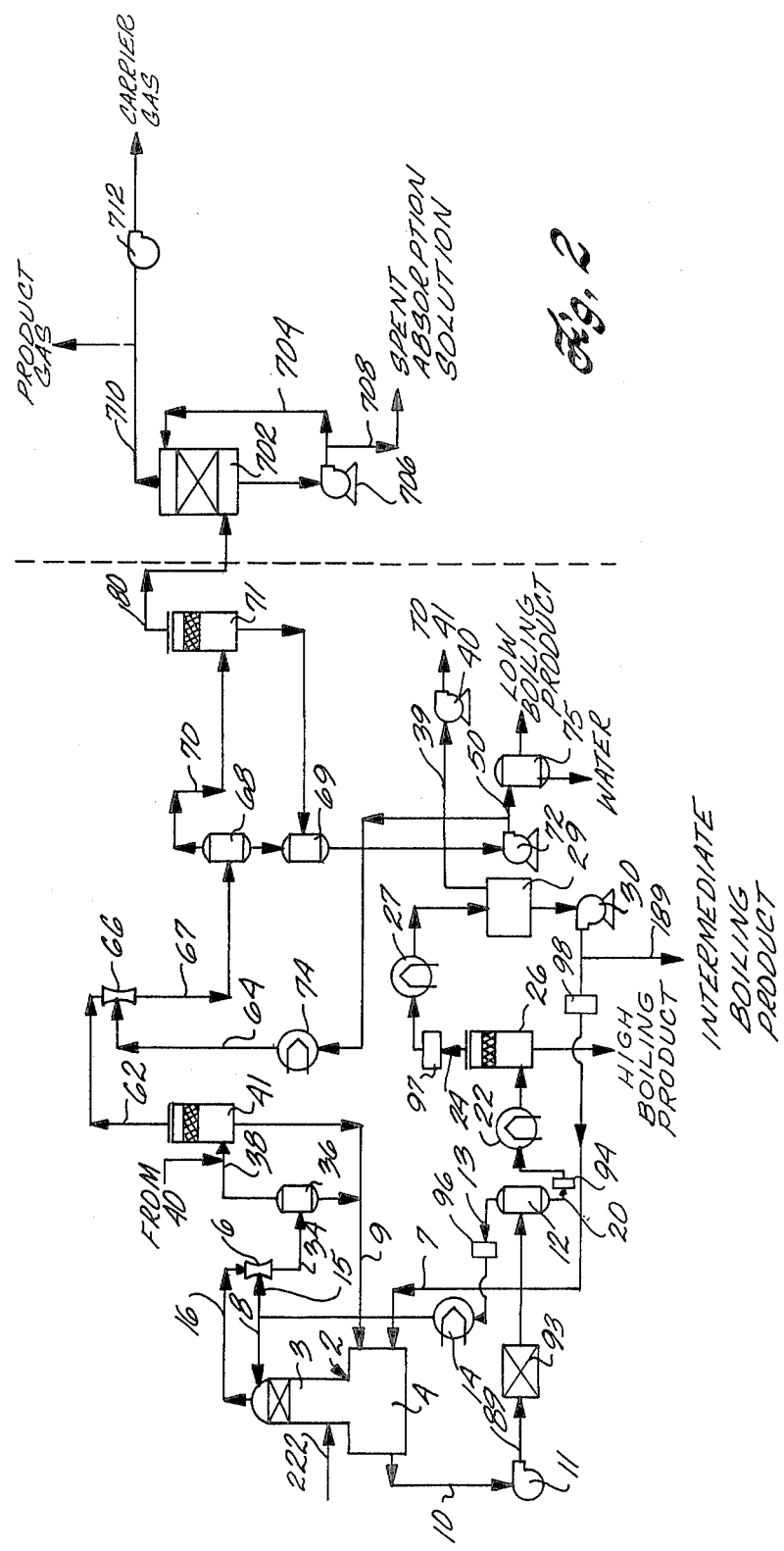
FIG. 2 shows in detail another pyrolytic vapor recovery operation embodying features of this invention.
Figure 1:
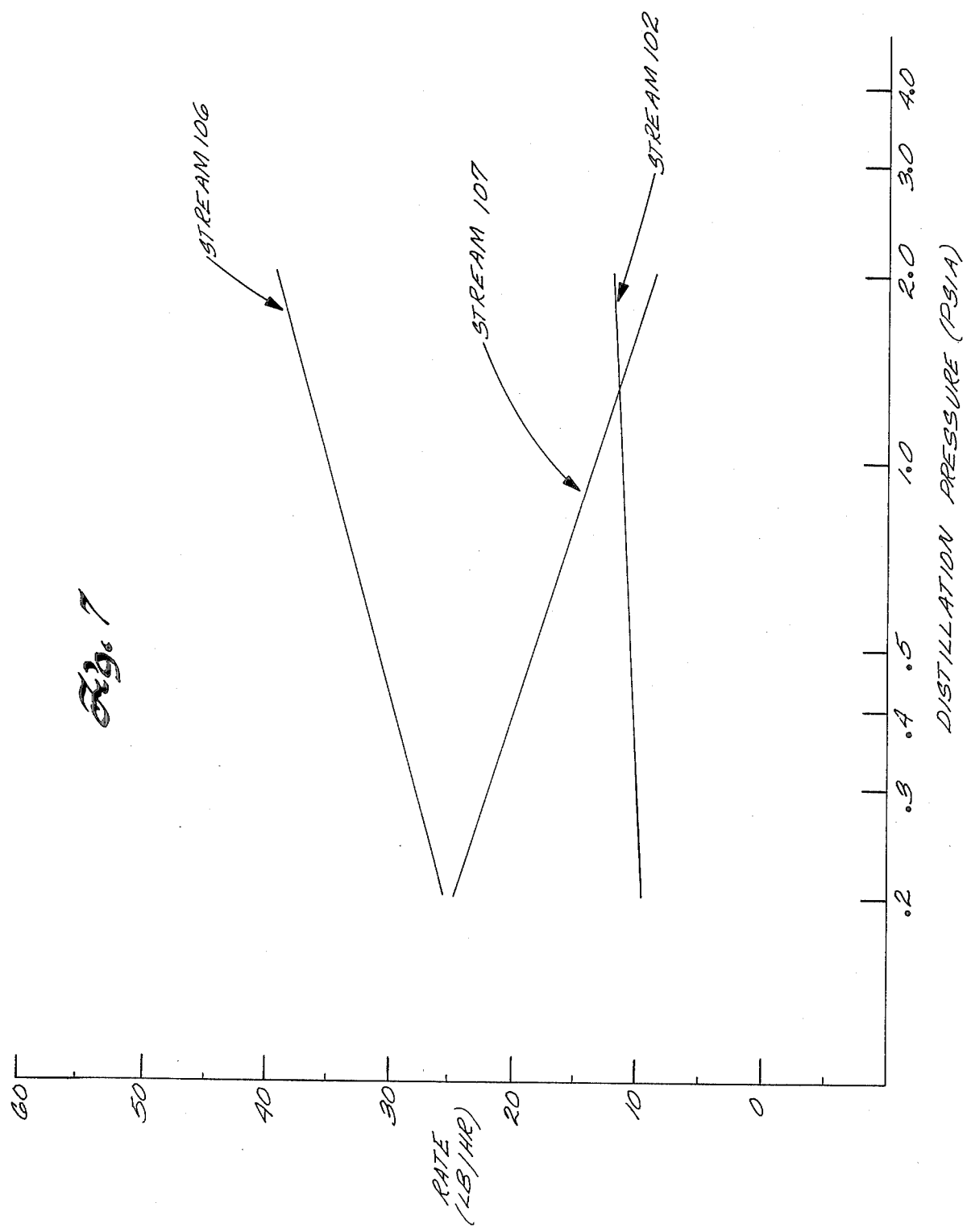
Figure 10:
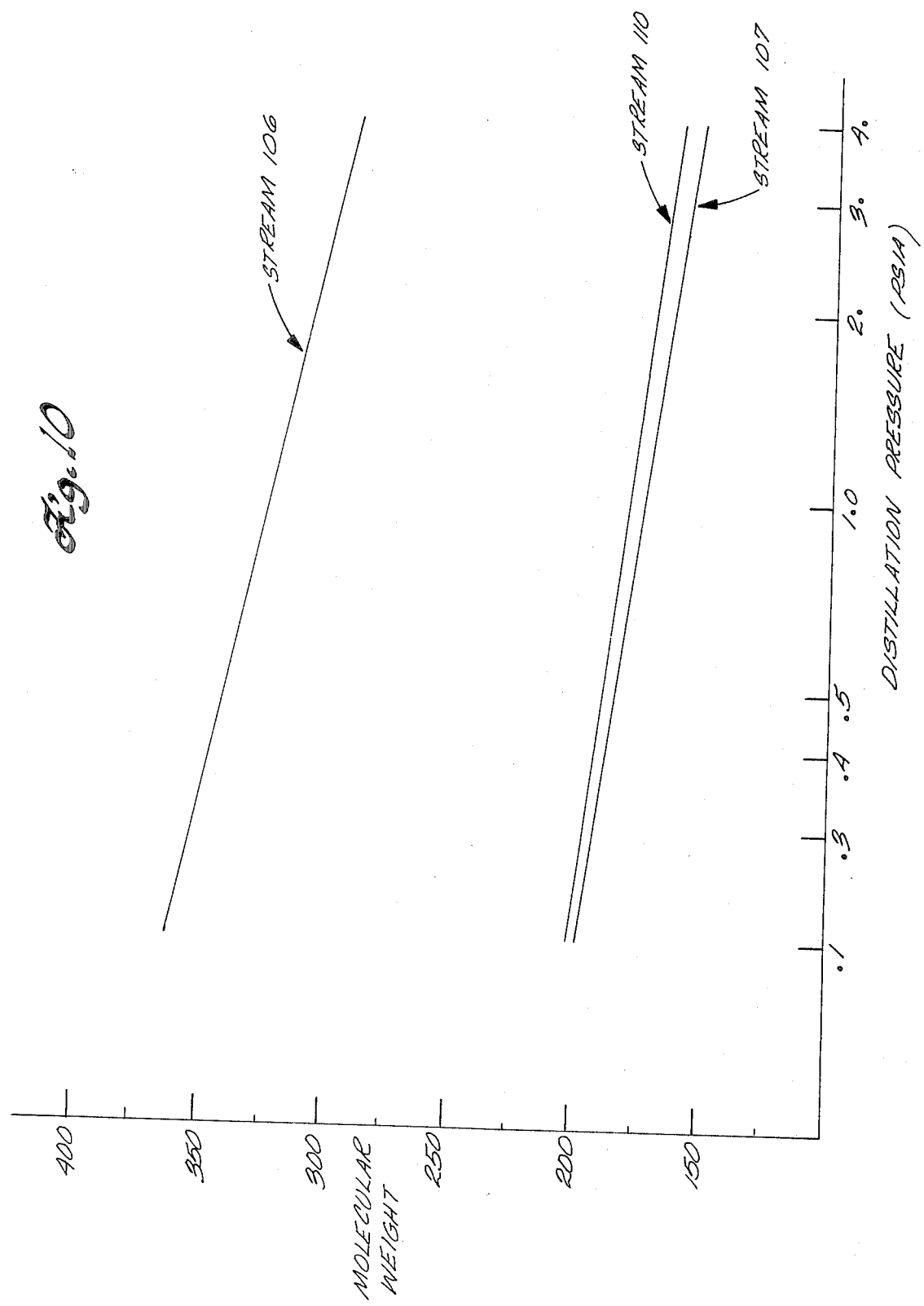
Figure 11:
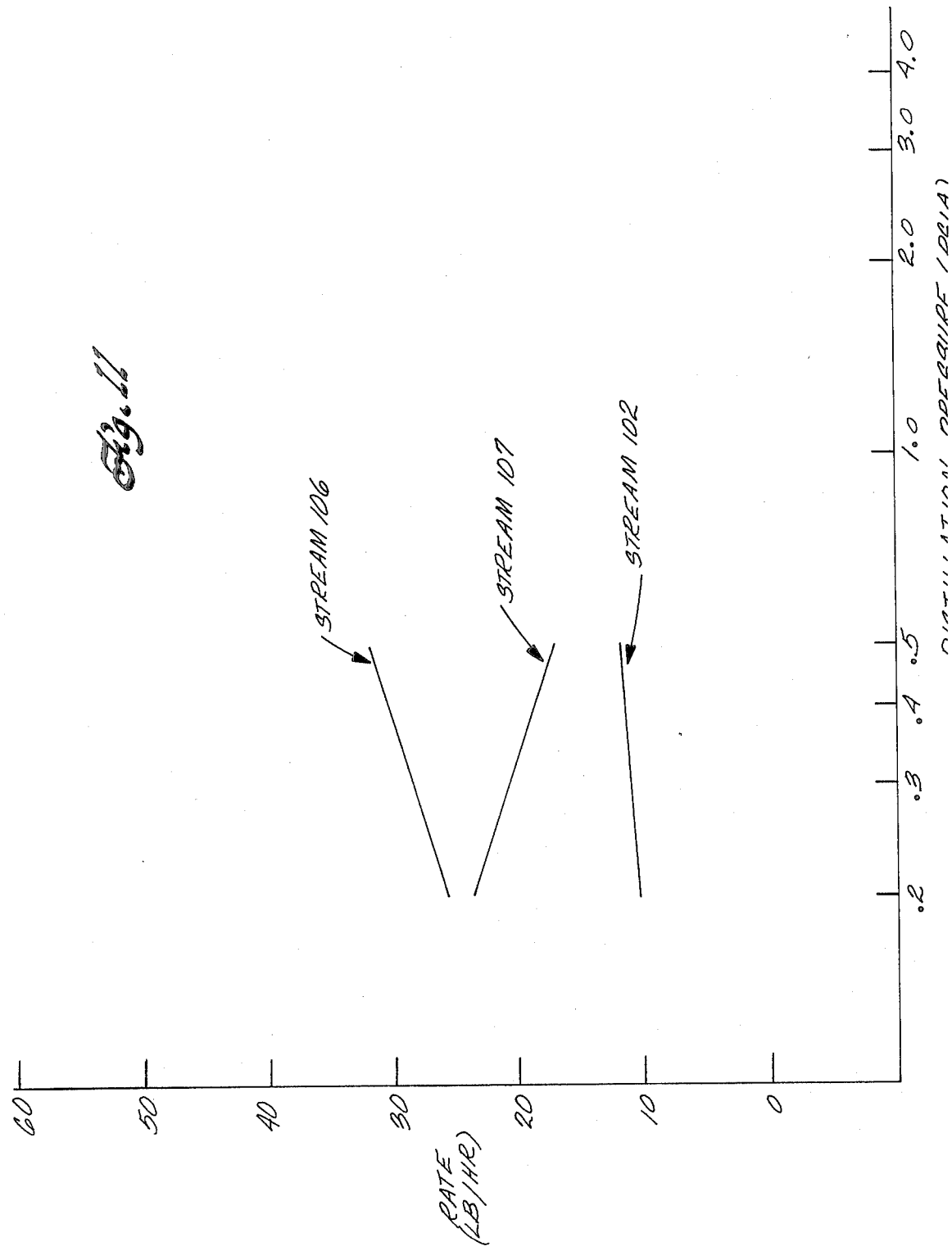
Figure 12:
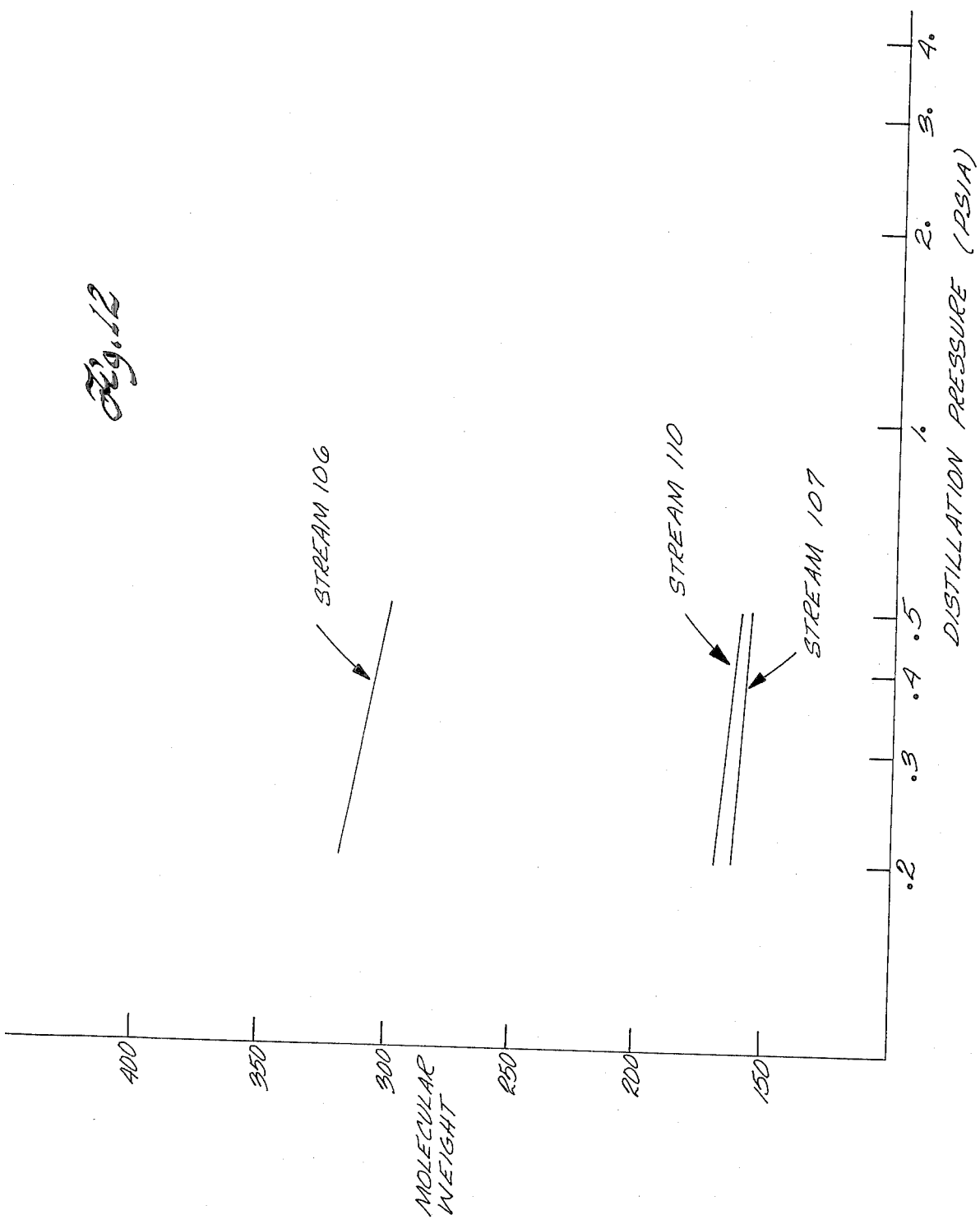

FIGS. 1 and 2 will now be discussed. These figures schematically show in detail working examples of the method of this invention used for recovering values from pyrolytic vapor streams obtained from pyrolysis of carbonaceous materials.

With reference to FIG. 1, hydrocarbon values are recovered from a gas stream 222 containing a pyrolytic vapor and entrained solids by direct heat exchange in a gas/liquid contacting zone with a liquid stream. The gas/liquid contacting zone can be a spray tower, a venturi contactor, a gas absorption tower, or the like, or combinations thereof.

A multiple stage quenched zone is preferred over a single stage quench zone. A single stage cannot possess all the features needed to operate effectively, particularly under difficult working conditions. A pyrolysis product stream resulting from pyrolysis of coal, having a high volatile content where substantial amounts of carrier gas are used and a high loading of entrained solids exemplifies a difficult working situation. The first stage of the contacting zone must not plug with mixtures of heavy viscous tars and entrained solid particulate matter. Also, it is desirable to remove most of the pyrolysis heat from the vapors in the first stage by adjustment of the rate and the temperature of the quench liquid. In addition, high quench liquid rates are desired in the first stage to knock out the entrained solids. Therefore, non-plugging apparatus, such as a wash tower spray or a loosely packed tower, are suitable equipment type for the first stage. However, a wash tower may not possess the necessary contacting efficiency when high volatile coal is rapidly pyrolyzed with substantial amounts of carrier gas. Thus, entrained liquids and aerosols can be found in the effluent of a first stage wash tower. Therefore, a second stage contacting device is needed to collect these entrained liquids and aerosols. Such a device should have a higher contacting efficiency than a wash tower. A high efficiency venturi scrubber is suitable for this application. Thus, a two-stage system consisting of a wash tower followed by a venturi scrubber functions effectively as a quench zone by providing most of the heat transfer and removing the bulk of the entrained solids in the wash tower stage, followed by the collection of the remainder of the entrained liquid material in a highly efficient scrubbing stage.

Accordingly, in the version of this invention shown in FIG. 1, a wash tower 2 and a venturi contactor 6 are used serially as first and second contacting stages, respectively, for the gas/liquid contacting zone. The wash tower 2 and the venturi contactor 6 are operated at substantially the same temperature. The first contacting stage 2 has a top condensation or quench section 3 and a bottom liquid collection or mixing section 4.

The gas stream 222 results from the pyrolysis of a carbonaceous material. The carbonaceous material can be a liquid such as shale oils, tars and oils, heavy refinery hydrocarbons, heavy hydrocarbons which result from pyrolysis, and the like, and solids, such as tar sands, oil shales, the organic portion of solid waste, coal, and the like, as well as mixtures thereof. The gas stream can contain entrained finely divided solids, particularly when a finely divided solid carbonaceous material is pyrolyzed or a carbonaceous material is pyrolyzed in the presence of a finely divided particulate material.

The pyrolytic vapor in the gas stream 222 can comprise volatilized hydrocarbons, carrier gases used to convey carbonaceous material to the pyrolysis reaction zone, and nonhydrocarbon components such as hydrogen sulfide, hydrogen, carbon monoxide, carbon dioxide, and water which can be generated in the pyrolysis reaction. The volatilized hydrocarbons have a wide range of boiling points ranging from methane to heavy, viscous tars.

In the processes shown in FIGS. 1 and 2 the full range of the hydrocarbon products in a pyrolytic vapor stream is recovered in three fractions. In the case of a pyrolytic vapor obtained from pyrolysis of coal, these three fractions are a low boiling hydrocarbon fraction containing $C_4$'s to constituents having a boiling point up to about 350° F., an intermediate boiling hydrocarbon fraction containing constituents having a boiling point in the range of from about 250° to about 650° F. and a high boiling or tar fraction containing constituents having a boiling point greater than about 550° F. Some overlap in these boiling point ranges is inevitable with conventional separation apparatus. All boiling points presented herein are at atmospheric pressure.

In the wash tower condensation, section 3 of the gas/liquid contacting zone, the pyrolytic vapor stream 222 is quenched and partially condensed by direct contact with a first quench liquid stream 8 to form a tar-containing condensate and partially condensed pyrolytic vapor 16. The partially condensed pyrolytic vapor stream 16 is then contacted with a second quench liquid stream in the first venturi contactor 6 to scrub any entrained tars in the form of vapors and aerosols from the partially condensed pyrolytic vapor.

The scrubbed, partially condensed pyrolytic vapor stream is separated from the combined stream of the quench liquid and entrained tars scrubbed in the first venturi contactor in a gas/liquid separator vessel 36 and then passed through line 38 along with vapors from a vacuum pump 40 to a demister drum 41 in which any additional entrained aerosols are separated for recycle to the wash tower. The overhead 62 from the demister drum 41 is the vapor residue. The second quench liquid stream and the separated aerosols contained in the second quench liquid stream are cycled to the wash tower 2 as stream 9.

The quench liquid streams are cooled hydrocarbon mixtures consisting essentially of tars mixed with a solvent or viscosity-lowering liquid comprising intermediate boiling hydrocarbons condensed from the pyrolytic vapor.

The tar-containing condensate from the wash tower condensation section and condensate from the first venturi contactor and quench liquid are collected as a combined liquid stream in the mixing section of the wash tower 2. In the mixing section they are mixed with a viscosity-lowering liquid comprising intermediate boiling hydrocarbons condensed from the pyrolytic vapor to form a mixed liquid. By mixing the tar-containing combined liquid stream with a comparatively low viscosity liquid, the viscosity of the combined liquid stream is substantially reduced.

The mixed liquid is withdrawn from the wash tower 2 through line 10 and pumped by pump 11 through a solids removal means 90. Suitable solids removal techniques include agglomeration, precipitation, filtration, centrifugation, hydrocloning, and gravity sedimentation. The presence of the viscosity-lowering liquid in the mixed liquid substantially reduces the viscosity of the mixed liquid and thereby allows effective removal of solids.

Following solids removal, the substantially solids-free mixed liquid is passed to the surge tank 12. A portion of the mixed liquid is withdrawn from the surge tank 12 via line 13 and cooled in a cooling zone such as shell-and-tube heat exchanger 14 to form the quench liquid, part of which is introduced as the first quench liquid stream 8 to the condensation section 3 of the wash tower 2 and part of which is introduced as the second quench liquid stream to the first venturi contactor 6. The cooling zone serves to recover the sensible heat of the pyrolytic vapor between the pyrolysis temperature and the quench temperature in the wash tower. The remainder of the mixed liquid is withdrawn from the surge tank 12 via line 20, and passed to a separation zone in which a tar fraction is recovered from the mixed liquid, thereby yielding a substantially tar-free viscosity-lowering liquid.

A vacuum flash system, such as the one shown in FIG. 1, can be used for effecting the separation of a high boiling hydrocarbon fraction from the mixed liquid. In this method, the mixed liquid stream 20 from the surge vessel 12 is heated in a heat exchanger 22 and then intermediate boiling hydrocarbons are flash vaporized from the tars in a vacuum flash zone 26. The tars are separated from the bottom of the vacuum flash zone 26 as tar product, and a substantially tar-free stream 24 after demisting in the vacuum flash zone 26 to remove entrained tars is then partially condensed in a partial condenser 27. The condensed liquid fraction of the viscosity-lowering liquid is recovered in a separator 29 and pumped by pump 30 to the mixing section 4 of the wash tower 2 as the viscosity-lowering liquid stream 7. Excess viscosity-lowering liquid beyond the amount required in the wash tower 2 is recovered as intermediate boiling hydrocarbon product via line 189. The vapors 39 from the separator 29 are withdrawn by vacuum pump 40 which provides the vacuum for the vacuum flash drum, and then sent to a demister drum 41, as described above.

It is preferred that separation of tars from viscosity-lowering liquid be effected at a low pressure. At least a pressure lower than the pressure in the wash tower, and more preferably a vacuum flash system is used because separation can be effected at relatively low temperatures under low pressures with minimal degradation of the tar product. However, other separation methods can be used such as a distillation column.

Solids removal zones 90' and 90", which can be the same type or a different type than separation zone 90, are used to remove solids from streams 13 and 20 respectively. The solids removal zones 90', 90" can be in addition to or instead of solids removal zone 90. Thus, solids can be removed from any or all of streams 89, 13 and 20. In addition, the surge tank 12 can be used to settle out solids from the mixed liquid if such solids are not removed in the solids removal zone 90. Preferably, solids are removed from the stream 20 passing to a separation zone because the rate of this stream is generally lower than the rate of streams 13 and 89, the other mixed liquid streams. Regardless of when the solids removal is conducted, the viscosity-lowering liquid and the recycled quenching liquid are substantially solids-free.

Preferably the vacuum flash zone 26 is operated so that only the lighter hydrocarbons are distilled and returned to the wash tower 2, and not the heavier tar product. This is effected by operating the flash drum 26 at a temperature close to the temperature of the wash tower, so that the heat load on the exchanger 22 before the flash drum is small. Preferably the temperature rise across the exchanger is only from about 100° to about 200° F., and the vacuum in the flash drum is about 1 psia or less. This also reduces the heat load on the partial condenser 27 downstream of the vacuum flash drum 26.

The distilled viscosity-lowering liquid can contain tar acids such as phenol, tar bases such as pyridine, and other valuable chemicals. These can be removed from the essentially tar-free viscosity-lowering liquid by well known methods, such as extraction. Removal of these valuable byproducts reduces consumption of hydrogen in subsequent hydrogenation operations described below because these byproducts tend to react with hydrogen to form water and ammonia.

At a high circulation rate of the viscosity-lowering liquid, many substantial advantages are realized. First, the viscosity-lowering liquid washes all pipes and equipment free of coke deposits. In addition, a high dilution resulting from high viscosity-lowering liquid rates improves the stability of the tars against self-polymerization and lowers the viscosity of the tars, thereby permitting easier handling of the viscous heavy tar. A high level of viscosity-lowering liquid also lowers the viscosity of the liquids in the wash tower 2, and thereby allows the tower to be operated at a lower temperature to minimize thermal degradation and cracking of the tar which can occur at high temperatures.

Another advantage of using high viscosity-lowering liquid loadings in the wash tower is that the relatively nonviscous condensate solution is easily subjected to solids removal in the solids removal zones 90, 90', 90". Thus fines can be separated from the mixed liquid, thereby upgrading the quality of the tar product and allowing recovery of the valuable carbon-containing solids. These solids can be sold as fuel, or can be recycled to a pyrolysis operation. During the recycle operation such solids can be oxidized in the presence of an oxygen supplying gas to provide heat for the pyrolysis operation.

During the separation of the solids there is generally lost some liquid hydrocarbon values which are separated along with the solids. Such liquid associated with the solids can be recycled along with the solids to a pyrolysis operation. Upon recycle to the pyrolysis reactor a lighter portion of such associated liquids is revaporized for subsequent collection and the heavier and residual portions are coked. Recycling of the associated liquid thereby generates additional liquid values and a pyrolytic coke which can form on the associated solids.

Also, due to the dilution of the tar containing condensate by the viscosity-lowering liquid, easier handling of the tar during hydrogenation results.

FIG. 2 shows a process the same as the process of FIG. 1 except there are no solids removal zones and there are six possible hydrogenation zones. However, this invention contemplates use of solids removal in combination with hydrogenation.

The collected liquid products can be upgraded into a more useful form. This upgrading can involve hydrogenating the liquids by either fluidized or fixed bed hydrogenation.

A particularly useful fluidized bed for hydrogenation is an ebullated bed hydrotreater. An "ebullated bed" as used herein refers to an agitated bed which contains solids, gas and liquid phases wherein the solids are the hydrogenation catalysts, the gas is hydrogen and material to be hydrogenated, and the liquid is material to be treated and can also be a support such as an oil suspension for the catalyst. Such an ebullated bed hydrogenation process is disclosed in an article "H-Oil Process" by I. Howard-Smith and G. J. Werner, *Coal Conversion Technology*, Noyes Data Corp., Park Ridge, N.J. (1976) pp. 18–19. A hydrogenation upgrading step can involve the removal of contaminants such as sulfur and nitrogen from the liquid, thereby resulting in a more environmentally acceptable fuel product. Hydrogenation can also enhance the chemical stability of the products resulting in products with improved handling and storage characteristics. Hydrocracking of liquids can produce lower molecular weight hydrocarbons suitable for use in such products as gasoline.

An advantage of the present invention is that hydrogenation of the condensed hydrocarbon pyrolytic vapors is facilitated because of the composition of the mixed liquid stream. The mixed liquid stream has a low viscosity due to the recycle and mixing of the viscosity-lowering liquid and the viscosity-lowering liquid provides a hydrogen donor capability to the mixed liquid. Recycling and mixing the viscosity-lowering liquid with the condensate liquid disperses the condensate and makes it more easily attacked and better distributed for treatment in either a fixed or fluidized bed hydrogen contacting apparatus. Dilution of the condensate by the viscosity-lowering liquid disperses the asphaltenes present in the condensate. Such dispersion of the asphaltenes enhances hydrogenation since the non-dispersed asphaltenes have a complex hydrogen bonded structure making attack by molecular hydrogen difficult. Dilution also provides a more uniform temperature profile, avoids localized hot spots due to exothermic reactions and thereby reduces coke formation tendency of the condensate during hydrogenation. The viscosity-lowering liquid which is recycled for mixing with the condensate can possess hydrogen donor capability. The viscosity-lowering liquid comprises primarily oils which possess hydrogen donor capability. As the viscosity-lowering liquid is a fraction of the mixed liquid, the hydrogen donative compounds therein are homogeneous with the condensate and thereby facilitate hydrogenation of the condensate.

There are six possible streams in the process of FIG. 2 which can be treated with hydrogen. This invention contemplates treating none or any combination of the streams. The streams which can be hydrogenated and their hydrogenation zones are: the mixed liquid 89 from the wash tower in hydrogenation zone 93; the mixed liquid flowing to the separation zone in hydrogenation zone 94; the mixed liquid cycled back to the wash tower in hydrogenation zone 96; uncondensed viscosity-lowering liquid after pressurization from the vacuum flash drum 26 in a vapor phase hydrogenation zone 97; high boiling hydrocarbon product from the flash drum 26; and condensed viscosity-lowering liquid in hydrogenation zone 98. When solids removal is used, the mixed liquid streams 13, 20, and 89 can be hydrogenated before or after solids removal. When fixed bed hydrogenation is utilized, solids removal is preferably conducted prior to hydrogenation as the solids tend to foul the hydrogenation apparatus, plug the catalytic beds and deactivate the catalyst.

Although solids removal before hydrogenation is preferred when hydrogenation is conducted in a fixed bed, it is the preferred practice of the process to utilize a fluidized bed for hydrogenation. Using a fluidized bed for hydrogenation does not require the prior removal of solids. Therefore, since the solids are not removed prior to hydrogenation, less liquid values are lost due to associated liquid being removed along with the solids.

Preferred fluidized bed hydrogenation can be conducted in an ebullated bed reactor whereupon desulfurization and denitrogenation reactions take place. In the ebullated bed reactor, catalyst particles are maintained in a state of continuous random motion by upflowing gas and liquid phases. Since the catalyst particles are not fixed in place, the solids present do not plug the hydrogenation reactor.

In a preferred version, a stream to be hydrogenated is hydrogenated in an ebullated bed reactor 400 as shown in FIG. 14. The hydrogenated effluent from the reactor is separated into a vapor stream 404 and a liquid stream 406 in a high pressure separator 402. The pressure at which the separation is conducted depends on the distribution of products desired in the fractions produced. The hydrogenated product vapor stream 404 is cooled and washed in a low pressure separator 408 to remove any ammonia and hydrogen sulfide which may be present. A condensate containing ammonia and hydrogen sulfide is removed from the low pressure separator 408 as a sour water condensate. The gas stream 410 from the low pressure separator is compressed and recycled to the hydrogenation reactor 400. The liquid condensate 406 from the high pressure separator and the oil condensate 412 from the low pressure separator can be further processed to produce gas, naphtha, light gas oil and bottoms. The bottoms 416 are vacuum flashed in a vacuum flash zone 418 to separate heavy gas oil and tar fractions. The tar fraction, containing solids, can be recycled to a pyrolysis reactor for coking of the tars and possible combustion of the solids for their heating value for use in the pyrolysis process.

A fluidized hydrogenation reactor is preferred over a fixed bed hydrogenated reactor to hydrogenate the above mentioned mixed liquid, viscosity-lowering liquid, quench liquid and/or the high boiling product. For example a fluidized bed hydrogenation reactor can be utilized at any one or any combination of the locations 93, 94, 96, 97, 98 and upon the high boiling product exiting the vacuum flash zone 26.

In a particularly preferred version of the process the second portion of the mixed liquid containing solids and leaving the surge vessel 12 via line 20 is hydrogenated in an ebullated bed reactor 94. A low sulfur content hydrogenated liquid is produced. This liquid can be fractionated by vacuum distillation, such as in vacuum flash zone 26, into a light fraction and a heavy high boiling fraction. The high boiling fraction including any solids can be recycled to the pyrolysis process for coking of the tars and combustion of the solids.

Although not shown in FIG. 2, the high boiling product obtained from the vacuum flash zone 26, which can contain the solids originally present in the mixed liquid, can be hydrogenated for recovery of values contained therein. For example, such a high boiling product can be hydrogenated in an ebullated bed reactor and the resultant hydrogenated product stream vacuum distilled for recovery of hydrocarbon values therein. The bottoms from the vacuum distillation along with the solids, which have been carried through the process, can be returned to the pyrolysis reactor for coking of the tars therein. Combustion of the solids to obtain any heating value in the solids can occur in a combustion chamber downstream of the pyrolysis reactor to provide a portion of the heat required for the pyrolysis operation.

Treating tars with hydrogen can be effected by such processes as hydrocracking. Treating tars with hydrogen not only serves to saturate unsaturated carbon-to-carbon bonds, it also can cause denitrogenation, desulfurization, deoxygenation, and cracking of the tars.

Hydrogenation can be effected at elevated pressures and temperatures in the presence of a catalyst. Suitable hydrogenation conditions are a temperature of from about 700° to 900° F., hydrogen partial pressures of from about 1000 to about 3000 psi, hydrogen rates between about 1000 to about 10,000 standard cubic feet per barrel of feed of hydrocarbon to be treated and from about 0.2 to about 3 volumes of hydrocarbon feed per hour per volume of catalyst. Suitable hydrogenation catalysts include metals such as nickel, molybdenum, tungsten and cobalt which can be supported on alumina or silica-alumina base.

Hydrogenation of liquids can also occur at elevated temperatures and pressures in the absence of a catalyst. Because freshly formed pyrolysis tars can be chemically unstable, they are susceptible to hydrogenation in the absence of a catalyst at hydrogenation conditions. Alternatively, entrained solid particulate matter can also promote the hydrogenation of the liquids at elevated temperatures and hydrogen partial pressures.

The recycled viscosity-lowering liquid stream 7 is easily hydrotreated in hydrotreated 98 which can be either a fixed bed if it is free of solids and porphyrins which tend to reduce the activity of a hydrotreating bed or a fluidized bed without removal of solids. If solids are present in the viscosity-lowering liquid such solids can be removed following fluidized bed hydrogenation by vacuum distillation or flash vaporization with retention of the solids in the bottoms. The bottoms as described above with reference to FIG. 14 are recyclable to the pyrolysis reactor. Hydrogenated viscosity-lowering liquid, as does unhydrogenated, viscosity-lowering liquid described above, can have some hydrogen transfer capabilities; thus hydrogen can be transferred to unstable free radicals in the heavy tar condensed in the wash tower, thereby stopping undesirable polymerization reactions in such heavy tar. This transfer of hydrogen can be accomplished in the mixing section of the wash tower, depending on the operating temperatures in the mixing section, or by heating and holding the mixed liquid at an elevated temperature and/or pressure.

since the viscosity-lowering liquid has a hydrogen donor capability, hydrogen transfer between such viscosity-lowering liquid and the condensate with which the viscosity-lowering liquid is mixed can be accomplished by holding the mixed liquid for a retention time of up to about two hours at a temperature of up to about 1000° F. Rather than hold the entire mixed liquid for such time and temperature, it is preferred that after separating the mixed liquid into a first portion and a second portion that the second portion be held up to about two hours at a temperature of up to about 1000° F. to effectuate hydrogen transfer between the viscosity-lowering liquid and the second portion of the mixed liquid.

In FIGS. 1 and 2, three separate streams, the first quench fluid 8, the essentially tar-free viscosity-lowering liquid 7, and the second quench liquid stream containing separated aerosols are introduced to the wash tower 2. Alternatively, any two or all three of these streams can be combined and introduced together as one stream to the condensation section 3 of the wash tower 2. This has the advantage that low boiling hydrocarbons which may be present in the viscosity-lowering liquid are vaporized in the condensation section to pass overhead from the wash tower.

The viscosity-lowering liquid 7 can advantageously be introduced to the wash tower through instrumentation taps, thereby continuously purging the taps to prevent them from being plugged by heavy tars and solids entrained by the pyrolytic vapor.

The remainder of the product recovery operation shown in FIGS. 1 and 2 is dedicated to recovery of low boiling hydrocarbons from the vapor residue 62, which contains pyrolysis products such as uncondensed volatilized hydrocarbons including low boiling hydrocarbons, water, hydrogen sulfide, carbon dioxide, and carbon monoxide. The vapor residue is contacted with a circulating scrubbing solution stream 64 in a second venturi contactor 66 to coalesce the water and condensible hydrocarbons. The scrubbing solution is an oil/water mixture containing from about 50 to about 70% water. The oil portion of the scrubbing solution is a cooled condensate of low boiling hydrocarbons condensed from the vapor residue in the second venturi 66. The liquid in the effluent stream 67 from the second venturi contactor 66 is separated from the gases in a liquid/gas separator 68 and then combined in a surge tank 69 with liquids entrained by the gas stream 70 from the separator which are removed in a demister 71. The liquids in the surge tank 69 are withdrawn by a pump 72 and a portion is cooled in a cooling zone 74 and then used as the scrubbing solution 64 for the venturi stage 66 for contacting the incoming vapor residue. The remainder of the liquid in the surge tank 69 is decanted in a decanter stage 75 into a water phase and a light oil phase. The water is withdrawn as water product and the light oil is withdrawn as low boiling hydrocarbons product.

The demister gaseous stream 80 from the gas liquid separator 71 is then sent to a gas cleanup operation 700 where it can be recovered as a fuel source.

The portions of FIGS. 1 and 2 to the right of the dotted line present in detail gas cleanup operation 700 used to clean the gaseous effluent 80 from the gas/liquid separator 71. The hydrogen sulfide and carbon dioxide in the gaseous effluent stream 80 are removed in a scrubber 702 in which the hydrogen sulfide and carbon dioxide are absorbed by a circulating stream of adsorption solution 704 pumped by a pump 706. Typical of the compounds which can be contained in the absorption solution which absorb hydrogen sulfide are the amines. A spent stream 708 of absorption solution can be degased to recover the hydrogen sulfide which may then be sent to a Claus unit for recovery of sulfur.

The sweet product off gas stream 710 from the scrubber 702 can be further treated for the recovery of other valuable products. This stream contains carbon monoxide and valuable hydrocarbons such as methane and ethane which may be recovered for heating value or as chemical feed stock. A portion of this stream can be compressed in a compressor 712 and used as a carrier gas in the pyrolysis operation used to generate the pyrolytic vapors.

The following examples demonstrate the value of this invention.

EXAMPLE 1

This example demonstrates the efficacy of the process of this invention in reducing the viscosity of tars condensed from pyrolytic vapors so that solids can be removed from the tars and the tars can be hydrogenated.

Referring to FIG. 3, 60 pounds per hour of pyrolytic vapors 101 are contacted in a contacting zone 120 with a quench liquid 111 obtained by cooling a first portion 110 of the mixed liquid from the mixing zone 122 in a cooling zone 128. Table 1 shows the 100° F. boiling point cuts of the pyrolysis vapor. This pyrolysis vapor is representative of an Eastern agglomerative bituminous coal. A temperature range of 0° to 1000° F. is covered. The contacting zone 120 is a single equilibrium stage vapor-liquid contacting device operating at 300° F. Vapor residue 102 is withdrawn from the contacting zone and a combined liquid stream of condensate liquid and quench liquid passes from the contacting zone 120 to the mixing zone 122 in which it is diluted with viscosity-lowering liquid, thereby forming the mixed liquid. The second portion 104 of the mixed liquid is passed at 120 lb/hr via line 104 to a separation zone 124 which is a single equilibrium stage flash distillation section operating at 500° F., 1 psia. Bottoms are withdrawn as tar product 106 and an intermediate boiling hydrocarbon fraction 105 is withdrawn as overhead from the distillation zone. A portion of the intermediate boiling hydrocarbon fraction is fed via line 108, condensed and cooled to 300° F. in a condensation zone 126, and then passed to the mixing zone 122 as viscosity-lowering liquid stream 109. The remainder is withdrawn via line 107 to keep inventory constant. The weight ratio of the viscosity-lowering liquid rate to condensate is 1.4. This is calculated by dividing the rate of stream 109 by the difference between the rates of streams 101 and 102.

Table 2 shows the mole fraction vapor, temperature, rate and average molecular weight of each stream of FIG. 3. Molecular weight is a good measure of viscosity of liquid hydrocarbons with an increase in molecular weight resulting in an increase in viscosity. As shown in Table 2, when the pyrolytic vapor has an average molecular weight of 166, the tar product has an average molecular weight of 326 and the condensate solution has an average molecular weight of only 192. Thus, the viscosity of the tar-containing condensate is substantially reduced by dissolving it in a solvent comprising intermediate boiling hydrocarbons and by selectively purging the high molecular weight tar product from the quenching system.

TABLE 1

Pyrolytic Vapor Stream 101 Composition

| Boiling Point Range (°F.) | Rate (lb/hr) |
| --- | --- |
| 0-100 | 3.0 |
| 100-200 | 3.6 |
| 200-300 | 4.2 |
| 300-400 | 4.8 |
| 400-500 | 5.4 |
| 500-600 | 6.0 |
| 600-700 | 7.2 |
| 700-800 | 9.0 |
| 800-900 | 10.8 |
| 900+ | 6.0 |

TABLE 2

| Stream Number | Stream Name | Mole Fraction Vapor | Temp. (°F.) | Rate (lb/hr) | Average Molecular Weight |
| --- | --- | --- | --- | --- | --- |
| 101 | Pyrolytic Vapor | 1 | 1075 | 60 | 166 |
| 102 | Vapor Residue | 1 | 300 | 9 | 74 |
| 103 | Combined Liquid | 0 | 300 | 377 | 192 |
| 104 | Mixed Liquid-Second Portion | .003 | 300 | 120 | 188 |
| 105 | Intermediate Boiling Hydrocarbons | 1 | 500 | 98 | 172 |
| 106 | Tar Product | 0 | 500 | 22 | 326 |
| 107 | Intermediate Boiling Hydrocarbon Product Viscosity-Lowering Liquid | 1 | 500 | 29 | 172 |
| 109 | Hydrocarbon Product Viscosity-Lowering Liquid | 0.02 | 300 | 70 | 172 |
| 110 | Mixed First Portion | 0.003 | 300 | 326 | 188 |
| 111 | Quench Liquid | 0 | 212 | 326 | 188 |

EXAMPLE 2

Example 2 is a series of four runs 2A, 2B, 2C and 2D using the process shown in FIG. 3 and discussed above in Example 1. Example 2 is used to demonstrate how the molecular weight of the tar product 106, intermediate boiling hydrocarbon product 107, and quench liquid 110, as well as how the rate of the vapor residue, tar product and intermediate boiling hydrocarbon product, can be adjusted by varying the operating conditions used for distillation in the separation zone 124. In each of the four runs, the distillation pressure is varied while the distillation temperature and feed rate to the separation zone are held constant. FIGS. 5-12 present the results. Table 3 presents the distillation temperature and feed rate of mixed liquid to the distillation zone which is used for each run, as well as the dependent variables presented in FIGS. 5-12.

FIGS. 5-12 indicate that the split of the pyrolytic vapor between vapor residue, tar product and intermediate hydrocarbon product as well as the molecular weight of the tar product, intermediate hydrocarbon product, and quench liquid all depend on the distillation conditions. Thus, by varying the feed rate of mixed liquid to the separation zone and the pressure and temperature in the separation zone, the quench rate, the molecular weight of the process streams and the split between the various product streams can be controlled for optimum recovery of hydrocarbons while permitting easy removal of solids and hydrogenation of the tar product.

TABLE 3

| Example | Figure Number | Distillation Temperature (°F.) | Distillation Pressure (psia) | Feed Rate to Separation Zone (lb/hr) | Dependent Variable |
| --- | --- | --- | --- | --- | --- |
| 2A | 5 | 500 | independent variable | 120 | rate of streams 102, 106, 107 |
| 2A | 6 | 500 | independent variable | 120 | average molecular weight of streams 106, 107, 110 |
| 2B | 7 | 400 | independent variable | 120 | rate of streams 102, 106, 107 |
| 2B | 8 | 400 | independent variable | 120 | average molecular weight of streams 106, 107, 110 |
| 2C | 9 | 500 | independent variable | 300 | rate of streams 102, 106, 107 |
| 2C | 10 | 500 | independent variable | 300 | average molecular weight of streams 106, 107, 110 |
| 2D | 11 | 400 | independent variable | 300 | rate of streams 102, 106, 107 |
| 2D | 12 | 400 | independent variable | 300 | average molecular weight of streams 106, 107, 110 |

EXAMPLE 3

Referring to FIG. 4, pyrolytic vapors are treated using the process of FIG. 3 with the added step of scrubbing a partially condensed pyrolytic vapor stream 112 from a first contacting stage 120' with a scrubbing water stream 113 in a water scrub stage 130. Thus two contacting stages in series are used to condense hydrocarbons from the pyrolytic vapor. A hydrocarbon condensate 115 is withdrawn from the scrub stage and passed to a mixing zone 122'. A water layer 114 is withdrawn from the water scrub zone as well as vapor residue stream 102'. Other differences between the process of FIG. 3 and the process of FIG. 4 are that the pyrolytic vapor is fed at a rate of 337.4 pounds per hour and the viscosity-lowering liquid stream 109' is cooled to 200° F. in the cooling zone 126' before being introduced to the mixing zone. Also, the quench liquid rate is maintained at 5000 lb/hr and the remainder of the mixed liquid is withdrawn from the mixing zone 122' for feed to the separation zone. The ratio of the viscosity-lowering liquid rate to the condensate rate is at 0.21, calculated by dividing the rate of stream 109' by the difference between the rates of streams 101' and 102'.

TABLE 4

| Pyrolytic vapor stream 101' composition | |
| --- | --- |
| Component or Boiling Point Range (°F.) | Rate (lb/hr) |
| Water | $3.759 \times 10^1$ |
| Nitrogen | $1.878 \times 10^2$ |
| Hydrogen | $1.089 \times 10^1$ |
| Carbon Monoxide | 2.436 |
| Carbon Dioxide | 1.253 |
| Methane | 6.204 |
| Ethylene | $8.139 \times 10^{-1}$ |
| Ethane | 1.113 |
| Propane | 1.664 |
| N-Butane | $4.410 \times 10^{-1}$ |
| N-Pentane | $2.205 \times 10^{-1}$ |
| Benzene | 2.193 |
| Toluene | $1.754 \times 10^{-1}$ |
| o-xylene | $4.167 \times 10^{-1}$ |
| m-xylene | $4.167 \times 10^{-1}$ |
| p-xylene | $4.167 \times 10^{-1}$ |
| 300–350 | 7.016 |
| 350–400 | 7.016 |
| 400–450 | 7.016 |
| 450–500 | 1.868 |
| 500–600 | 5.604 |
| 600–700 | 7.472 |
| 700–800 | $1.121 \times 10^1$ |
| 800–900 | $1.806 \times 10^1$ |
| 900+ | $1.806 \times 10^1$ |

Table 5 shows the mole fraction vapor, temperature, rate, and average molecular weight for each stream shown in FIG. 4.

As shown by Table 5, a tar product having an average molecular weight of about 350 is produced while the mixed liquid stream 104' has a molecular weight of only about 191, thereby indicating a low viscosity and relatively easy removal of entrained solids from the tars and hydrogenation of the tars.

TABLE 5

| Stream Number | Stream Name | Mole Fraction Vapor | Temp. (°F.) | Rate (lb/hr) | Average Molecular Weight |
| --- | --- | --- | --- | --- | --- |
| 101' | Pyrolytic Vapor | 1 | 1075 | 337.4 | 22.769 |
| 102' | Vapor residue | 1 | 40 | 219 | 17.013 |
| 103' | Combined liquid | 0 | 200 | 5038 | 192.884 |
| 104' | Mixed liquid-second portion | 1 | 199 | 107.3 | 191.26 |
| 105' | Intermediate boiling hydrocarbon | 1 | 500 | 65.9 | 149.049 |
| 106' | Tar product | 0 | 500 | 41.45 | 347.847 |
| 107' | Intermediate boiling hydrocarbon product | 1 | 500 | 41.06 | 149.003 |
| 109' | Viscosity-lowering liquid | 0 | 200 | 24.82 | 149.003 |
| 110' | Mixed liquid-first portion | 1 | 199 | 5000 | 191.26 |
| 111' | Quench liquid | 1 | 168 | 5000 | 191.26 |
| 112 | Partially condensed pyrolytic vapor | 1 | 200 | 299.5 | 19.854 |
| 113 | Scrubbing water | 0 | 35 | 2229 | 18 |
| 114 | Spent scrubbing water | 0 | 40 | 2265 | 18 |
| 115 | Intermediate boiling hydrocarbon condensate | 0 | 40 | 44.59 | 106.658 |

EXAMPLE 4

This example demonstrates the advantage obtained by diluting a tar fraction with an intermediate hydrocarbon fraction to permit easy removal of solids from the tar fraction.

Coal tar and char were produced by the pyrolysis of Wyoming subbituminous coal. The coal tar contained 14.98% char by weight. Two coal tar fractions were obtained from the total coal tar sample. The first coal tar fraction (Tl) was obtained by heating the coal tar at 350° F. at atmospheric pressure and thereby removing the lower boiling components. The second coal tar fraction (T2) was obtained from the coal tar as an overhead distillation cut from 350° F., atmospheric pressure, to 500° F., 0.2 psia. The char sample was separated into a +400 mesh cut (C1) and a −400 mesh cut (C2) by screening.

Six experiments (4A-4F) were conducted to determine the effect of settling temperature and composition on the percent chars settling in 2 hours. The composition and settling temperature for each experiment as well as the percent char settled are presented in Table 6. Comparison of experiments 4A to 4B, 4C to 4D, and 4E to 4F indicates that the addition of a light distillate fraction to a heavier tar fraction promotes char separation by settling. A comparison of experiments 4A and 4B to 4C and 4D indicates that smaller particles are more difficult to settle than larger particles. A comparison of experiments 4A and 4B to 4E and 4F indicates that settling improves with an increase in settling temperature because viscosity decreases with an increase in temperature. In all six experiments it was noted that the char settling extends were directly related to viscosity differences of the various mixtures.

TABLE 6

| Experiment | Settling Time (hour) | Settling Temperature (°F.) | Initial Composition Wt. % | | | | % Char Settled |
|---|---|---|---|---|---|---|---|
| | | | T1 | T2 | C1 | C2 | |
| 4A | 2 | 300 | 70 | 25 | 5 | 0 | 90.0 |
| 4B | 2 | 300 | 95 | 0 | 5 | 0 | 12.6 |
| 4C | 2 | 300 | 70 | 25 | 0 | 5 | 85.0 |
| 4D | 2 | 300 | 95 | 0 | 0 | 5 | 8.7 |
| 4E | 2 | 210 | 70 | 25 | 5 | 0 | 73.0 |
| 4F | 2 | 210 | 95 | 0 | 5 | 0 | 1.9 |

EXAMPLE 5

This example demonstrates the effectiveness of diluting a heavy tar-fraction with viscosity-lowering liquid in reducing the viscosity of the heavy tar fraction.

An Eastern bituminous Hamilton coal was pyrolyzed at 1100° F. using a solid heat carrier. The bulk of the hydrocarbons generated by the pyrolysis of the coal were collected and the light ends removed by heating the hydrocarbons to 350° F. at one atmosphere. The heavy tar fraction had a viscosity of about 5000 centipoises (cps) at a temperature of 300° F. as measured with a Brookfield viscometer.

A viscosity-lowering liquid was obtained by distilling hydrocarbons derived from pyrolysis of a Whoming coal. The viscosity-lowering liquid contained hydrocarbons between a cut point of 350° F. at one atmosphere and a cut point of 500° F. at 0.2 psia. The viscosity-lowering liquid had a viscosity of about 5.5 cps at a temperature of 210° F. as measured with a Brookfield viscometer.

The viscosities of various blends of the heavy tar fraction and the viscosity-lowering liquid were measured with a Brookfield viscometer at 210° F. and at 300° F. These viscosities are plotted against the percent by weight of the heavy tar fraction in FIG. 13. This figure shows a significant lowering of viscosity of the heavy tar fraction obtained even when low levels of viscosity-lowering liquid are mixed with the heavy tar fraction.

Although this invention has been described in considerable detail with reference to certain versions thereof, it will be understood that variations and modifications can be effected within the spirit and scope of the invention as described above and defined in the appended claims.

What is claimed is:

1. A process for recovery of values from hydrocarbon-containing vapors which comprises the steps of:
    (a) contacting hydrocarbon-containing vapors which are at a temperature of at least 700° F. in a quench zone with a quench liquid consisting essentially of hydrocarbons, said quench liquid having a temperature sufficiently low to form a condensate and a vapor residue from the hydrocarbon-containing vapors, the condensate and quench liquid forming a combined liquid stream;
    (b) mixing a viscosity-lowering liquid comprising hydrocarbons with said combined liquid stream to form a mixed liquid, said viscosity-lowering liquid having a viscosity lower than the viscosity of said mixed liquid, and said mixed liquid having a viscosity lower than the viscosity of said combined liquid stream;
    (c) cooling a first portion of said mixed liquid to form said quench liquid and recycling said cooled first portion of said mixed liquid to the quench zone for contacting said hydrocarbon-containing vapors;
    (d) separating a second portion of said mixed liquid into at least a viscosity-lowering liquid and a high boiling hydrocarbon fraction having a higher volume average boiling point than the volume average boiling point of said viscosity-lowering liquid;
    (e) mixing at least a portion of the viscosity-lowering liquid separated from the second portion of said mixed liquid with said combined liquid stream; and
    (f) recovering said high boiling hydrocarbon fraction.

2. A process for recovery of values from hydrocarbon-containing vapors as claimed in claim 1, wherein the temperature of said mixed liquid is between about 100° F. and a temperature less than 700° F.

3. A process for recovery of values from hydrocarbon-containing vapors as claimed in claim 1, wherein the temperature of said mixed liquid is between about 200° F. and about 500° F.

4. A process for recovery of values from hydrocarbon-containing vapors as claimed in claim 1, wherein the weight ratio of said viscosity-lowering liquid mixed with said combined liquid stream to said condensate is from about 0.01 to about 500.

5. A process for recovery of values from hydrocarbon-containing vapors as claimed in claim 1, wherein the weight ratio of said viscosity-lowering liquid mixed with said combined liquid stream to said condensate is from about 0.1 to about 100.

6. A process for recovery of values from hydrocarbon-containing vapors as claimed in claim 1, wherein said separating of said second portion of said mixed liquid is by distillation.

7. A process for recovery of values from hydrocarbon-containing vapors as claimed in claim 1, wherein said separating of said second portion of said mixed liquid is by flash vaporization at less than atmospheric pressure.

8. A process for recovery of values from hydrocarbon-containing vapors as claimed in claim 1, further comprising recovering a portion of said viscosity-lowering liquid separated from said mixed liquid.

9. A process for recovery of values from hydrocarbon-containing vapors as claimed in claim 1, further comprising cooling at least a portion of said viscosity-lowering liquid mixed with said combined liquid stream prior to mixing said viscosity-lowering liquid with said combined liquid stream.

10. A process for recovery of values from hydrocarbon-containing vapors as claimed in claim 1, wherein the vapor residue contains uncondensed hydrocarbons, and further comprising contacting the vapor residue containing uncondensed hydrocarbons with additional quench liquid to form additional condensate.

11. A process for recovery of values from hydrocarbon containing vapors as claimed in claim 1, further comprising treating the high boiling hydrocarbon fraction with hydrogen.

12. A process for recovery of values from hydrocarbon-containing vapors as claimed in claim 1, which further comprises treating the viscosity-lowering liquid with hydrogen to provide hydrogen donor capability to the viscosity-lowering liquid prior to mixing said viscosity-lowering liquid with said combined liquid stream.

82. A process for recovery of values from hydrocarbon-containing vapors generated in a pyrolysis zone and containing finely divided solids which comprises the steps of:
  (a) contacting hydrocarbon-containing vapors which are at a temperature of at least 700° F. in a quench zone with a quench liquid consisting essentially of hydrocarbons, said quench liquid having a temperature sufficiently low to form a condensate and a vapor residue from the hydrocarbon-containing vapors, the condensate and quench liquid forming a combined liquid stream containing the finely divided solids;
  (b) mixing a viscosity-lowering liquid comprising hydrocarbons with said combined liquid stream to form a mixed liquid, said viscosity-lowering liquid having a viscosity lower than the viscosity of said mixed liquid, said mixed liquid having a viscosity lower than the viscosity of said combined liquid stream, and said mixed liquid containing finely divided solids;
  (c) cooling a first portion of said mixed liquid to form said quench liquid and recycling said cooled first portion to the quench zone for contacting said hydrocarbon-containing vapors;
  (d) separating a second portion of said mixed liquid into at least a viscosity-lowering liquid and a high boiling hydrocarbon fraction containing the finely divided solids and having a higher average boiling point than the volume average boiling point of said viscosity-lowering liquid;
  (e) recycling and mixing at least a portion of the viscosity-lowering liquid with said combined liquid stream;
  (f) treating said high boiling hydrocarbon fraction containing finely divided solids with hydrogen;
  (g) distilling the hydrogenated high boiling hydrocarbon fraction under vacuum for forming a light, low boiling fraction and a heavy bottoms fraction which contains said finely divided solids;
  (h) recycling said heavy bottoms fraction containing such solids to the pyrolysis zone;
  (i) recovering said light, low boiling fraction.

83. A process as claimed in claim 82 wherein said high boiling hydrocarbon fraction of said second portion of the mixed liquid comprises about five percent of the mixed liquid.

84. A process for recovery of values from pyrolytic vapors having a temperature of at least 700° F. wherein the pyrolytic vapors comprise tars, intermediate boiling hydrocarbons, low boiling hydrocarbons and entrained finely divided solids which comprises the steps of:
  (a) contacting in a condensation zone of a first quench stage which includes a liquid mixing zone, the pyrolytic vapor with a quench liquid, which is a cooled liquid mixture consisting of tars dissolved in intermediate boiling hydrocarbons condensed from the pyrolytic vapor to form a first condensate containing tars and finely divided solids condensed from the pyrolytic vapor, and a second pyrolytic vapor containing uncondensed hydrocarbons;
  (b) contacting in a second quench stage the second pyrolytic vapor containing uncondensed hydrocarbons with a quench liquid to form a second condensate containing intermediate boiling hydrocarbons, and a vapor residue;
  (c) separating the second condensate from the vapor residue;
  (d) mixing in the liquid mixing zone of the condensation zone, the first condensate containing tars and finely divided solids from the first quench stage and the second condensate from the second quench stage with a viscosity-lowering liquid comprising intermediate boiling hydrocarbons to form a mixed liquid;
  (e) separating and cooling a first portion of said mixed liquid to form said quench fluid, and recycling the cooled quench liquid to the first quench zone and the second quench zone;
  (f) separating a second portion of said mixed liquid into at least a viscosity-lowering liquid and a high boiling hydrocarbon fraction containing the finely divided solids and having a higher average boiling point than the volume average boiling point of said viscosity-lowering liquid;
  (g) mixing at least a portion of the viscosity-lowering liquid with the first and second condensate;
  (h) treating said high boiling hydrocarbon fraction containing finely divided solids with hydrogen;
  (i) distilling the hydrogenated high boiling hydrocarbon fraction under vacuum for forming a light, low boiling fraction and a heavy bottoms fraction which contains finely divided solids;
  (j) recycling said heavy bottoms fraction containing finely divided solids to the pyrolysis operation;
  (k) recovering said light, low boiling fraction; and
  (l) recovering low boiling hydrocarbons from the vapor residue.

* * * * * boiling fraction having a higher volume average boiling point than the volume average boiling point of said viscosity-lowering liquid;

(e) mixing at least a portion of the viscosity-lowering liquid separated from the second portion of said mixed liquid with said combined liquid stream;

(f) recovering said high boiling fraction; and (g) recovering at least a portion of the vapor residue.

48. A process as claimed in claim 47 in which the viscosity-lowering liquid is hydrogenated to have hydrogen donor capacity and which further comprises the step of holding said second portion of said mixed liquid for a retention time of up to about two hours at a temperature of up to about 1000° F. for effecting hydrogen transfer between said combined liquid stream and the hydrogenated viscosity-lowering liquid having hydrogen donor capability prior to separating the viscosity-lowering liquid from said second portion of the mixed liquid.

49. A process as claimed in claim 47 wherein the pyrolytic vapor contains entrained finely divided char, and including the steps of recovering at least a portion of the entrained char and recycling said recovered char to the pyrolysis zone.

50. A process as claimed in claim 47 in which the weight ratio of said viscosity-lowering liquid mixed with said combined liquid stream to said condensate is from about 0.1 to about 100.

51. A process as claimed in claim 47 wherein the pyrolytic vapor contains entrained finely divided char, and wherein the entrained finely divided char separates from the pyrolytic vapor and collects in the mixed liquid, the additional step of removing the finely divided char from the mixed liquid.

52. A process as claimed in claim 47 in which said second portion of said mixed liquid is separated by distillation.

53. A process as claimed in claim 47 further comprising the addition step of treating said high boiling temperature fraction with hydrogen.

54. A process as claimed in claim 47 comprising the additional step of treating viscosity-lowering liquid with hydrogen prior to mixing viscosity-lowering liquid with said combined liquid stream.

55. A process as claimed in claim 47 comprising the additional step of treating the mixed liquid with hydrogen.

56. A process as claimed in claim 47, which comprises the additional step of withdrawing a portion of the viscosity-lowering liquid as an intermediate boiling hydrocarbon fraction.

57. A process as claimed in claim 48 further comprising the step of hydrogenating said second portion of the mixed liquid with hydrogen during the retention time.

58. A process as claimed in claim 50 wherein the pyrolytic vapor contains entrained finely divided char, and including the steps of recovering at least a portion of the entrained char and recycling said recovered char to the pyrolysis zone.

59. A process as claimed in claim 51 which comprises the step of treating the mixed liquid with hydrogen after removing the finely divided char from the mixed liquid.

60. A process as claimed in claim 53 wherein the high boiling fraction contains finely divided char and in which, prior to hydrogen treatment, the char is separated with a portion of the high boiling fraction and recycled to the pyrolysis zone.

61. A process as claimed in claim 53 which further comprises following the hydrogen treating of the high boiling fraction, the additional steps of:

(a) separating the hydrogen treated high boiling fraction into a light, low boiling fraction and a heavy, high boiling fraction; and (b) recycling said heavy, high boiling fraction to the pyrolysis zone to produce by pyrolysis pyrolytic vapor.

62. A process as claimed in claim 54 which further comprises following the hydrogen treating of the viscosity-lowering liquid, the additional steps of:

(a) separating the hydrogen treated, viscosity-lowering liquid into a light, low boiling fraction and a heavy, high boiling fraction; and (b) recycling said heavy, high boiling fraction to the pyrolysis zone to produce by pyrolysis pyrolytic vapor.

63. A process as claimed in claim 62 wherein the viscosity-lowering liquid entrains finely divided char and in which, following hydrogen treatment, the char is separated with the heavy, high boiling fraction, partially combusted and recycled to the pyrolysis zone.

64. A process as claimed in claim 55 which further comprises following the hydrogen treating of the mixed liquid, the additional steps of:

(a) separating the hydrogen treated, mixed liquid into a light, low boiling fraction and a heavy, high boiling fraction and (b) recycling said heavy, high boiling fraction to the pyrolysis zone to produce by pyrolysis pyrolytic vapor.

65. A process as claimed in claim 55 including the step of treating the said second portion of said mixed liquid with hydrogen.

66. A process as claimed in claim 55 including the step of treating said first portion of said mixed liquid with hydrogen.

67. A process as claimed in claim 64 wherein the mixed liquid contains finely divided char and which following hydrogen treatment, the char is separated along with the heavy, high boiling fraction, partially combusted and recycled to the pyrolysis zone.

68. A process as claimed in claim 65 which further comprises following hydrogen treating the second portion of said mixed liquid, the additional steps of:

(a) separating the hydrogen treated second portion of mixed liquid into a light, low boiling fraction and a heavy, high boiling fraction and (b) recycling said heavy, high boiling fraction to the pyrolysis zone to produce by pyrolysis pyrolytic vapor.

69. A process as claimed in claim 68 wherein the second portion of the mixed liquid contains finely divided char and in which following hydrogen treatment, the char is separated along with the heavy, high boiling fraction, partially combusted and recycled to the pyrolysis zone.

70. A process as claimed in claim 66 which further comprises following the hydrogen treating of the first portion of the mixed liquid, the additional steps of:

(a) separating the hydrogen treated first portion of the mixed liquid into a light, low boiling fraction and a heavy, high boiling fraction and (b) recycling said heavy, high boiling fraction to the pyrolysis zone to produce by pyrolysis pyrolytic vapor.

71. A process as claimed in claim 70 wherein the first portion of the mixed liquid contains finely divided char and in which following hydrogen treatment, the char is separated along with the heavy, high boiling fraction, partially combusted and recycled to the pyrolysis zone.

72. A process as claimed in claim 56, which further comprises treating intermediate boiling hydrocarbon fraction with hydrogen.

73. A process as claimed in claim 72 which further comprises following the hydrogen treating of the intermediate boiling hydrocarbon fraction, the additional steps of:
(a) separating the hydrogen treated intermediate boiling fraction into a light, low boiling fraction and a heavy, high boiling fraction; and
(b) recycling said heavy, high boiling fraction to the pyrolysis zone to produce, by pyrolysis, pyrolytic vapor.

74. A process as claimed in claim 73 wherein the intermediate boiling fraction contains finely divided char and in which following hydrogen treatment, the char is separated along with the heavy, high boiling fraction, partially combusted and recycled to the pyrolysis zone.

75. In a coal pyrolysis process wherein finely divided coal is pyrolyzed in a pyrolysis zone to produce finely divided char and a pyrolytic vapor having a temperature of at least 700° F., a process for the recovery of values from said pyrolytic vapor which comprises the steps of:
(a) quenching pyrolytic vapor having a temperature of at least 700° F. to a temperature less than the temperature of the pyrolytic vapor and between about 100° F. and 700° F. in a quench zone with a quench liquid consisting essentially of hydrocarbons to form a condensate and a vapor residue from the pyrolytic vapor, the condensate and quench liquid forming a combined liquid stream;
(b) mixing a viscosity-lowering liquid comprising hydrocarbons with said combined liquid stream to form a mixed liquid, said viscosity-lowering liquid having a viscosity lower than the viscosity of said mixed liquid, and said mixed liquid having a viscosity lower than the viscosity of said combined liquid stream;
(c) cooling and recycling a first portion of said mixed liquid to the quench zone for contacting said pyrolytic vapors;
(d) distilling a second portion of said mixed liquid into at least a viscosity-lowering liquid for mixing with said combined liquid stream and a high boiling fraction having a higher volume average boiling point than the volume average boiling point of said viscosity-lowering liquid;
(e) mixing at least a portion of the viscosity-lowering liquid separated from the second portion of said mixed liquid with said combined liquid stream;
(f) recovering said high boiling fraction; and
(g) recovering at least a portion of the vapor residue.

76. A process as claimed in claim 75 in which the step of distilling said second portion comprises flash vaporizing said second portion of the mixed liquid at less than atmospheric pressure.

77. A process as claimed in claim 75 in which said pyrolytic vapor contains entrained finely divided char and wherein the entrained finely divided char separates from the pyrolytic vapor and collects in the mixed liquid, the additional step of separating the finely divided char from the mixed liquid.

78. A process as claimed in claim 77 which comprises treating the mixed liquid with hydrogen after removing the finely divided char from the mixed liquid.

79. A process as claimed in claim 75 in which the entrained finely divided char is separated from the pyrolytic vapor and collects in mixed liquid and which comprises the additional steps of treating at least one liquid stream selected from the mixed liquid stream, the high boiling fraction of the second portion of the mixed liquid stream, the viscosity-lowering fraction of the second portion of the mixed liquid stream, the first portion of the mixed liquid stream, and the second portion of the mixed liquid stream, with hydrogen and subsequently separating the finely divided char from said liquid stream.

80. A process as claimed in claim 79 further comprising the steps of:
(a) separating the hydrogen treated liquid stream into a heavy, high-boiling fraction and a light, low-boiling fraction with the char remaining substantially in the heavy, high boiling fraction and
(b) recycling the heavy, high boiling fraction containing the char to the pyrolysis zone for producing pyrolytic vapor.

81. A process for recovery of values from hydrocarbon-containing vapors generated in a pyrolysis operation and containing finely divided solids which comprises the steps of:
(a) contacting hydrocarbon-containing vapors at a temperature of at least 700° F. in a quench zone with a quench liquid consisting essentially of hydrocarbons, said quench liquid having a temperature sufficiently low to form a condensate and a vapor residue from the hydrocarbon-containing vapors, the condensate and quench liquid forming a combined liquid stream containing the finely divided solids;
(b) mixing a viscosity-lowering liquid comprising hydrocarbons with said combined liquid stream to form a mixed liquid, said viscosity-lowering liquid having a viscosity lower than the viscosity of said mixed liquid, said mixed liquid having a viscosity lower than the viscosity of said combined liquid stream, and said mixed liquid containing the finely divided solids;
(c) cooling a first portion of said mixed liquid to form said quench liquid and recycling said cooled first portion to the quench zone for contacting said hydrocarbon-containing vapors;
(d) treating a second portion of said mixed liquid containing finely divided solids with hydrogen;
(e) separating finely divided solids from the hydrogen treated second portion of said mixed liquid;
(f) recycling such separated finely divided solids to the pyrolysis zone;
(g) separating said hydrogen treated second portion of said mixed liquid following separation of the finely divided solids into at least a viscosity-lowering liquid and a high boiling hydrocarbon fraction having a higher volume average boiling point than the volume average boiling point of said viscosity-lowering liquid;
(h) recycling and mixing at least a portion of the viscosity-lowering liquid with said combined liquid stream; and
(i) recovering said high boiling hydrocarbon fraction.

UNITED STATES PATENT AND TRADEMARK OFFICE
CERTIFICATE OF CORRECTION

PATENT NO. : 4,225,415
DATED : September 30, 1980
INVENTOR(S) : Zia I. Mirza, Everett W. Knell & Bruce L. Winter It is certified that error appears in the above-identified patent and that said Letters Patent are hereby corrected as shown below:

Column 2, line 41, "research" should be -- Research --. Column 6, line 3, "than" should be -- then --; line 9, delete "°" after "500". Column 12, line 63, "hydrotreated", second occurrence, should be -- hydrotreater. Column 13, line 15, "since" should be -- Since --. Column 14, line 14, "adsorption" should be -- absorption --; line 66, "1.4" should -- 1:4 --. Column 16, Table 2 - continued, Stream Name of Stream Number 110 should read, instead of "Mixed First Portion", -- Mixed Liquid - Second Portion --. Column 19, line 29, "Whoming" should be --Wyoming--. Column 21, line 38, insert after "separating" and before "solids", -- finely divided --.

Signed and Sealed this

Seventh Day of December 1982

[SEAL]

Attest:

GERALD J. MOSSINGHOFF

Attesting Officer    Commissioner of Patents and Trademarks

UNITED STATES PATENT AND TRADEMARK OFFICE
CERTIFICATE OF CORRECTION

PATENT NO. : 4,225,415

DATED : September 30, 1980

INVENTOR(S) : Zia I. Mirza, Everett W. Knell & Bruce L. Winter

It is certified that error appears in the above-identified patent and that said Letters Patent are hereby corrected as shown below:

Column 2, line 41, "research" should be -- Research --. Column 6, line 3, "than" should be -- then --; line 9, delete "°" after "500". Column 12, line 63, "hydrotreated", second occurrence, should be -- hydrotreater. Column 13, line 15, "since" should be -- Since --. Column 14, line 14, "adsorption" should be -- absorption --; line 66, "1.4" should -- 1:4 --. Column 16, Table 2 - continued, Stream Name of Stream Number 110 should read, instead of "Mixed First Portion", -- Mixed Liquid - Second Portion --. Column 19, line 29, "Whoming" should be --Wyoming--. Column 21, line 38, insert after "separating" and before "solids", -- finely divided --.

Signed and Sealed this

Seventh Day of December 1982

[SEAL]

Attest:

GERALD J. MOSSINGHOFF

Attesting Officer

Commissioner of Patents and Trademarks